US012630361B2

(12) United States Patent
Whelan et al.

(10) Patent No.: US 12,630,361 B2
(45) Date of Patent: May 19, 2026

(54) APPARATUS FOR RETRIEVING STORAGE CONTAINERS FROM A STORAGE AND RETRIEVAL SYSTEM

(71) Applicant: Ocado Innovation Limited, Hatfield (GB)

(72) Inventors: Matthew Robert Whelan, Hatfield (GB); Wilhelm Karl Johannisson, Hatfield (GB)

(73) Assignee: Ocado Innovation Limited, Hatfield (GB)

( * ) Notice: Subject to any disclaimer, the term of this patent is extended or adjusted under 35 U.S.C. 154(b) by 26 days.

(21) Appl. No.: 17/914,958

(22) PCT Filed: Jan. 25, 2022

(86) PCT No.: PCT/EP2022/051652
§ 371 (c)(1),
(2) Date: Sep. 27, 2022

(87) PCT Pub. No.: WO2023/025418
PCT Pub. Date: Mar. 2, 2023

(65) Prior Publication Data
US 2024/0294331 A1　Sep. 5, 2024

(30) Foreign Application Priority Data
Aug. 27, 2021　(GB) ..................................... 2112308

(51) Int. Cl.
*B65G 1/04*　(2006.01)
*B65G 1/06*　(2006.01)
*B66C 19/00*　(2006.01)

(52) U.S. Cl.
CPC ......... *B65G 1/0464* (2013.01); *B65G 1/0478* (2013.01); *B65G 1/065* (2013.01); *B66C 19/00* (2013.01); *B65G 2207/30* (2013.01)

(58) Field of Classification Search
CPC .... B65G 1/0464; B65G 1/0478; B65G 1/065; B65G 2207/30; B66C 19/00
See application file for complete search history.

(56) References Cited

U.S. PATENT DOCUMENTS 4,160,617 A * 7/1979 Montgomery ....... B65G 63/004
198/300
5,190,427 A * 3/1993 Lai ....................... B65G 1/0478
414/239

(Continued)

FOREIGN PATENT DOCUMENTS

CN　　107406239 A　11/2017
WO　2015019055 A1　2/2015

(Continued)

OTHER PUBLICATIONS

Office Action issued on Feb. 21, 2025 by the Australian Patent Office in corresponding Australian Application No. 2022335617 (3 pages) corresponding to Applicant's U.S. Appl. No. 17/914,958.

(Continued)

*Primary Examiner* — Saul Rodriguez
*Assistant Examiner* — Ashley K Romano
(74) *Attorney, Agent, or Firm* — Gregory Matt McCloskey

(57) ABSTRACT

A load handling device for lifting and moving one or more containers stackable in a storage and retrieval system, the load handling device including plural modular sections arranged in a vertical stack, the modular sections including: a) a container lifting mechanism including a grabber device b) a wheel assembly; c) a wheel positioning mechanism; and d) electrical components for controlling the container lifting mechanism and wheel positioning mechanism. Each modular section can include at least four connecting blocks to form a rectangular frame, wherein the connecting blocks of vertically adjacent modular sections are connectable in a (Continued)

vertical stack to form an open frame structure including the rectangular frames, the open frame structure supporting the container lifting mechanism, the wheel assembly, the wheel positioning mechanism and the electrical components.

35 Claims, 17 Drawing Sheets

(56)                     References Cited

U.S. PATENT DOCUMENTS

| | | | |
|---|---|---|---|
| 12,042,933 B2 * | 7/2024 | Keyes | B25J 15/0616 |
| 2015/0175354 A1 * | 6/2015 | Kharkover | E04H 6/225 |
| | | | 414/807 |
| 2018/0148259 A1 * | 5/2018 | Gravelle | B65G 1/04 |
| 2021/0086993 A1 | 3/2021 | Lindbo et al. | |
| 2021/0114808 A1 * | 4/2021 | Austrheim | B65G 1/0464 |
| 2021/0139239 A1 * | 5/2021 | Austrheim | B65G 1/0492 |
| 2021/0147201 A1 | 5/2021 | Austrheim | |
| 2024/0140761 A1 * | 5/2024 | Vaish | B66C 9/04 |
| 2024/0294331 A1 * | 9/2024 | Whelan | B65G 1/0464 |
| 2024/0425279 A1 * | 12/2024 | Corser | B65G 1/0464 |

FOREIGN PATENT DOCUMENTS

| | | | |
|---|---|---|---|
| WO | 2015185628 A2 | 12/2015 | |
| WO | 2017153583 A1 | 9/2017 | |
| WO | 2019206437 A1 | 10/2019 | |
| WO | 2019206488 A1 | 10/2019 | |
| WO | 2019238702 A1 | 12/2019 | |
| WO | 2021148657 A1 | 7/2021 | |
| WO | 2021175940 A1 | 9/2021 | |

OTHER PUBLICATIONS

International Search Report (PCT/ISA/210) and Written Opinion (PCT/ISA/237) mailed on May 23, 2022, by the European Patent Office as the International Searching Authority for International Application No. PCT/EP2022/051652. (15 pages).

Office Action issued on Aug. 19, 2025 by the Canadian Patent Office in corresponding Canadian Application No. 3,230,316 (5 pages) corresponding to Applicant's U.S. Appl. No. 17/914,958.

Ocado Innovation Limited, "Ocado Re:Imagined", posted Jan. 19, 2022, accessed via the Wayback Machine of the Internet Archive on Nov. 24, 2025, URL = https://twitter.com/OcadoGroup/status/1483741312348213251 (showing dimly-lit embodiment of the claimed invention).

Examination Report issued on Dec. 19, 2025 by the European Patent Office in corresponding U.S. Appl. No. 17/914,958 (5 pages) corresponding to Applicant's U.S. Appl. No. 17/914,958.

Office Action issued on Jan. 28, 2026 by the Chinese Patent Office in corresponding CN U.S. Appl. No. 17/914,958.7 (18 pages) corresponding to Applicant's U.S. Appl. No. 17/914,958.

* cited by examiner

30

32

34

36

38

39

10

(a)

(b)

(a)

(b)

214            140c 204            140d

202

210

330

228

322

326

(a)

326

330

332

322

334

336

(b)

420a

422

420b

530a

532

520a

522

526

530b

520b

522

520b

520a

APPARATUS FOR RETRIEVING STORAGE CONTAINERS FROM A STORAGE AND RETRIEVAL SYSTEM

FIELD OF INVENTION

The present invention relates to an apparatus for retrieving storage containers from a storage and retrieval system. In particular, but not exclusively, the invention relates to a robotic load handling device for handling storage containers in the storage and retrieval system comprising a grid framework structure.

BACKGROUND

Storage and retrieval systems 1 comprising a three-dimensional storage grid framework structure, within which storage containers/bins are stacked on top of each other, are well known. PCT Publication No. WO2015/185628A (Ocado) describes a known storage and fulfilment or distribution system in which stacks of bins or containers are arranged within a grid framework structure. The bins or containers are accessed by load handling devices remotely operative on tracks located on the top of the grid framework structure. A system of this type is illustrated schematically in FIGS. 1 to 3 of the accompanying drawings.

As shown in FIGS. 1 and 2, stackable containers, known as storage bins or containers 10, are stacked on top of one another to form stacks 12. The stacks 12 are arranged in a three dimensional grid framework structure 14 in a warehousing or manufacturing environment. The grid framework structure is made up of a plurality of storage columns or grid columns. Each grid in the grid framework structure has at least one grid column for storage of a stack of containers. FIG. 1 is a schematic perspective view of the grid framework structure 14, and FIG. 2 is a top-down view showing a stack 12 of bins 10 arranged within the framework structure 14. Each bin 10 typically holds a plurality of product items (not shown), and the product items within a bin 10 may be identical, or may be of different product types depending on the application. Bins 10 may also be referred to as storage bins or containers or storage containers or totes.

In detail, the three dimensional grid framework structure 14 comprises a plurality of vertical uprights or upright members or upright columns 16 that support horizontal grid members 18, 20. A first set of parallel horizontal grid members 18 is arranged perpendicularly to a second set of parallel horizontal grid members 20 to form a grid structure or grid 15 comprising a plurality of grid cells 17. The grid cell has an opening to allow a load handling device to lift a container or storage bin through the grid cell. In the grid structure, the first set of parallel horizontal grid members 18 intersect the second set of parallel horizontal grid members at nodes. The grid structure is supported by the upright members 16 at each of the nodes or at the point where the grid members intersect such that the upright members are interconnected at their tops ends by the intersecting grid members. The grid members 16, 18, 20 are typically manufactured from metal and typically welded or bolted together or a combination of both. The storage bins or containers 10 are stacked between the upright members 16 of the grid framework structure 14, so that the upright members 16 guard against horizontal movement of the stacks 12 of bins 10, and guide vertical movement of the storage bins 10.

The top level of the grid framework structure 14 includes rails 22 arranged in a grid pattern across the top of the stacks 12. Referring additionally to FIG. 3, the rails 22 support a plurality of load handling devices 30. A first set 22a of parallel rails 22 guide movement of the robotic load handling devices 30 in a first direction (for example, an X-direction) across the top of the grid framework structure 14, and a second set 22b of parallel rails 22, arranged perpendicular to the first set 22a, guide movement of the load handling devices 30 in a second direction (for example, a Y-direction), perpendicular to the first direction. In this way, the rails 22 allow movement of the robotic load handling devices 30 laterally in two dimensions in the horizontal X-Y plane, so that a load handling device 30 can be moved into position above any of the stacks 12.

A known load handling device or robotic load handling device otherwise known as a bot 30 shown in FIGS. 4 and 5 comprising a vehicle body 32 is described in PCT Patent Publication No. WO2015/019055 (Ocado), hereby incorporated by reference, where each load handling device 30 only covers a single grid space or grid cell of the grid framework structure 14. Here, the load handling device 30 comprises a wheel assembly comprising a first set of wheels 34 consisting of a pair of wheels on the front of the vehicle body 32 and a pair of wheels 34 on the back of the vehicle 32 for engaging with the first set of rails or tracks to guide movement of the device in a first direction, and a second set of wheels 36 consisting of a pair of wheels 36 on each side of the vehicle 32 for engaging with the second set of rails or tracks to guide movement of the device in a second direction. Each of the sets of wheels are driven to enable movement of the vehicle in X and Y directions respectively along the rails. One or both sets of wheels can be moved vertically to lift each set of wheels clear of the respective rails, thereby allowing the vehicle to move in the desired direction, e.g. X or Y direction on the grid structure.

WO2017/153583 (Ocado Innovation Limited) teaches a load handling device comprising a wheel positioning mechanism or directional change mechanism for enabling lateral movement of the device in one of two transverse directions by enabling either a first or second set of wheels to selectively engage the first or second set of rails or tracks (22a or 22b). The wheel positioning mechanism comprises a complicated arrangement of linkages driven by a linear actuator or motor to selectively lower or raise the first set of wheels or the second set of wheels into engagement or disengagement with the first set of tracks or rails or the second set of tracks or rails.

The load handling device 30 is equipped with a lifting mechanism or container lifting mechanism or crane mechanism to lift a storage container from above. The crane mechanism comprises a winch tether or cable 38 wound on a spool or reel (not shown) and a grabber device 39 in the form of a lifting frame. The lifting device comprise a set of lifting tethers 38 extending in a vertical direction and connected nearby or at the four corners of the lifting frame 39, otherwise known as the grabber device (one tether near each of the four corners of the grabber device) for releasable connection to a storage container 10. The grabber device 39 is configured to releasably grip the top of a storage container 10 to lift it from a stack of containers in a storage system of the type shown in FIGS. 1 and 2.

The wheels 34, 36 are arranged around the periphery of a cavity or recess, known as a container-receiving recess 41, in the lower part. The recess is sized to accommodate the container 10 when it is lifted by the crane mechanism, as shown in FIGS. 5(a and b). When in the recess, the container is lifted clear of the rails beneath, so that the vehicle can move laterally to a different location. On reaching the target location, for example another stack, an access point in the storage system or a conveyor belt, the bin or container can be lowered from the container receiving portion and released from the grabber device. The container receiving space may comprise a cavity or recess arranged within the vehicle body, e.g. as described in WO 2015/019055 (Ocado Innovation Limited). Alternatively, the vehicle body of the load handling device may comprise a cantilever as taught in WO2019/238702 (Autostore Technology AS), in which case the container receiving space is located below a cantilever of the load handing device. In this case, the grabber device is hoisted by a cantilever such that the grabber device is able to engage and lift a container from a stack into a container receiving space below the cantilever.

Typically, the load handling device comprises one or more electrical components such as a rechargeable power source to provide power to the drive units for operating the lifting mechanism and the wheel positioning mechanism and a control unit. For example, one or more load handling devices remotely operable on the grid structure are configured to receive instructions from a master controller to a retrieve a storage container from a particular a storage location within the grid framework structure. Wireless communications and networks may be used to provide the communication infrastructure from the master controller via one or more base stations to the one or more load handling devices operative on the grid structure. A controller in the load handling device in response to receiving the instructions is configured to control various driving mechanisms to control the movement of the load handling device. For example, the load handling device may be instructed to retrieve a container from a storage column at a particular location on the grid structure. The instruction can include various movements in an X-Y direction on the grid structure. Once at the storage column, the lifting mechanism is then operated to grab the storage container and lift it into a container receiving space in the body of the load handling device where it is subsequently transported to a another location on the grid structure commonly known as a drop off port. The container is lowered to a suitable pick station allow retrieval of the item from the storage container. Movement of the load handling devices on the grid structure also involves the load handling devices being instructed to move to a charging station which is usually located at the periphery of the grid structure. The electrical components of the load handling device are typically housed within the body of the load handling device.

Considering the number of components, which includes various motors, pulleys and electrical components such as a battery and control board needed for the load handling device to operate on the grid framework structure, the assembling of the individual components together is one of biggest costs in the manufacture of a load handling device. Considering that there are hundreds of load handling devices operable on the grid framework structure, the cumulative costs of multiple load handling devices operable on the grid structure represent a significant proportion of the cost of a typical storage and retrieval system. Not only are the costs in the manufacture of the load handling devices representative of a significant proportion of the costs of the retrieval and retrieval system, but also the weight of the load handling device, which can weigh in excess of 150 kg, can lead to other additional costs. For example, due to the weight of the load handling device, the grid framework structure needs to have sufficient structural integrity to bear the weight of multiple load handling device operable on the grid framework structure. Various bracing elements are used to increase the strength of the grid framework structure which ultimately adds to the costs of the grid framework structure, and thus the overall cost of the storage and retrieval system. As the weight of the load handling increases, more power is also required to drive the wheel motors to move the load handing device on the tracks at a sufficient speed, which in turn translates into bigger and more powerful electrical motors and a bigger battery to provide the necessary power to drive the electrical motors.

A load handling device is thus required that is easy to assemble, is lightweight and lower cost to manufacture.

SUMMARY OF THE INVENTION

The present invention has mitigated the above problem by providing a load handling device or robotic load handling device comprising a plurality of modules that are connectable to another in a vertical stack wherein each of the modules provides respective functional characteristics of the load handling device such as the wheel assembly, wheel positioning mechanism, container lifting mechanism, and electrical components. The individual modules are connectable, allowing the modules providing the different functions of the load handling device to be vertically stacked. In order to connect the individual modules together, the individual modules comprise a plurality of connecting blocks that provide connection points for stacking of the modules. More specifically, the present invention provides a load handling device for lifting and moving one or more containers stackable in a storage and retrieval system, the storage and retrieval system comprising a grid structure comprising a plurality of grid members comprising a first set of grid members and a second set of grid members, the second set of grid members being substantially perpendicular to the first set of grid members such that the plurality of grid members are arranged in a grid pattern for guiding the movement of the load handling device on the grid structure, the load handling device comprises a plurality of modular sections arranged in a vertical stack, the plurality of modular sections comprising:

a) a container lifting mechanism comprising a container gripper assembly configured to releasably grip a container and a drive mechanism configured to raise and lower the container gripping assembly;
 b) a wheel assembly comprising a first set of wheels for engaging with the first set of grid members to guide movement of the load handling device in a first direction and a second set of wheels for engaging with the second set of grid members to guide the movement of the load handling device in a second direction, wherein the second direction is transverse to the first direction;
 c) a wheel positioning mechanism configured for selectively lowering or raising the first set of wheels or the second set of wheels into engagement or disengagement with the first set of grid members or the second set of grid members;

wherein each of the plurality of modular sections further comprises at least four connecting blocks, each of the four connecting blocks being connected to two other connecting blocks in a single modular section by one or more horizontal connecting elements to form a rectangular frame, and wherein the at least four connecting blocks of vertically adjacent modular sections are connectable in the vertical stack by one or more vertical connecting elements to form an open frame structure comprising a plurality of the rectangular frames, said open frame structure being configured to support the container lifting mechanism, the wheel assembly, the wheel positioning mechanism.

For the purpose of the present invention, each of the first and second set of grid members can optionally comprise a track support to which is mounted a track system comprising a first set of tracks mounted on the first set of grid members and a second set of tracks mounted on the second set of grid members. The track system can be a separate component to the grid member or alternatively, the track system can be integrated into the grid member as a single body, i.e. forms part of the grid member. The load handling device is operative to move along the track of the grid.

Optionally, the load handling device comprises one or more electrical components, e.g. the one or more electrical components comprising a power source and/or a processor for controlling the container lifting mechanism and wheel positioning mechanism, Preferably, the open frame structure is a three dimensional open frame structure that defines a volume for housing at least a portion of the lifting mechanism, and/or the wheel assembly, and/or the wheel positioning mechanism, and/or the electrical components. For the purpose of the present invention, the term "open frame structure" is defined as a structure where the internal operational components of the load handling device, e.g. any one of the spools for carrying the lifting tethers of the container lifting mechanism, and/or the power source and/or the control unit, are visible externally of the load handling device. Preferably, the open frame structure defines a plurality of modular sections, the plurality of modular sections comprising the lifting mechanism, the wheel assembly, the wheel positioning mechanism and the electrical components. The term open frame structure is construed to cover a load handing device with no external cladding such that the internal components providing the functional characteristics of the load handling device of the load handling device are visible externally.

Preferably, vertically adjacent rectangular frames of the open frame structure define a volumetric region of the load handling device, e.g. the open frame structure is a three dimensional open frame structure.

Not only do the at least four connecting blocks allow the different modular sections to be easily connectable in a vertical stack, but also each of the at least four connecting blocks can be connected to two other connecting blocks in a single modular section by one or more horizontal connecting elements to form a rectangular frame. The connection between the connecting blocks to two other corner connecting blocks in a single modular frame can be directly to two adjacent connecting blocks or indirectly via another connecting block.

A plurality of the rectangular frames are thus connectable to one another in a vertical stack by one or more vertical connecting elements to form an open frame structure. The different functions of the load handling device such as the container lifting mechanism, the wheel assembly, the wheel positioning mechanism, and/or the electrical components are supported by the open frame structure. The term "supported" is construed broadly to include being physically being supported by the open frame structure and/or forming part of the open frame structure.

For ease of assembly of the open frame structure, optionally, the one or more horizontal and/or vertical connecting elements comprises a connecting rod or tube. The connecting rods can easily be grasped and assembled into the blocks in different rotational orientations. Thus, assembly of the load handling device is easier with connecting blocks and connecting rods. To aid with reducing the weight of the load handling device, optionally the connecting rod comprises carbon fibre in a polymer matrix. To increase the structural integrity of the open frame structure, optionally, the rectangular frames in one or more of the plurality of modular tier sections are braced by one or more bracing elements extending between one or more of the opposing horizontal connecting elements. Preferably, the one or more bracing elements comprise crossed bracing elements. In addition to the horizontal and the vertical connecting elements providing structural support to the open frame structure, one or more bracing elements extend across the horizontal and/or vertical connecting elements. The one or more bracing elements can also provide additional support to anchor one or more components of the lifting mechanism, and/or the wheel assembly, and/or the wheel positioning mechanism, and/or the electrical components.

Optionally, the at least four connecting blocks comprise four corner brackets such that each corner bracket of the four corner brackets is connected to two other corner brackets in a single modular frame to form the rectangular frame.

To increase the ease by which the rectangular frames can be connected together in a vertical stack, optionally, the one or more vertical connecting elements extends vertically through the connecting blocks of one or more of the at least four connecting blocks of vertically adjacent rectangular frames in the vertical stack. In other words, the vertical element is common to one or more connecting blocks of vertically adjacent rectangular frames. This allows the open frame structure to be built up by individually mounting the rectangular frames to one or more vertical connecting elements. The number of modular sections, and thus functional requirements of the load handling device, can be tailored by increasing the number of rectangular frames mounted to the one or more vertical connecting elements.

Preferably, one or more of the at least four connecting blocks of one or more of the plurality modular sections are connected to the one or more horizontal and/or vertical connecting elements by a joint. Connection between the horizontal connecting elements and the brackets by the joint optionally comprises a continuous glue channel. To increase the functionality of one or more of the four corner blocks, the continuous glue channel is integrated into the one or more of the at least four connecting blocks. Preferably, the one or more of the at least four connecting blocks comprises one or more injection points in fluid communication with the continuous glue channel for injecting adhesive into the continuous glue channel. Optionally, one or more of the connecting blocks comprises a socket for receiving an end of the connecting rod or tube. Preferably, the socket is integrally formed within the connecting blocks. To secure the connecting rods or tubes to the connecting blocks, preferably, the socket has a substantially cylindrical internal wall, the cylindrical internal wall having a groove extending continuously around at least a portion of the cylindrical internal wall of the socket for distributing an adhesive axially along the receiving end of the rod, the groove being configured to form a glue channel when the receiving end of the connecting rod is inserted into the socket. Preferably, the one or more of the at least four connecting blocks comprises one or more injection points in fluid communication with the groove for injecting adhesive into the glue channel. This assists with the simplicity of connecting the one or more blocks of one or more of the plurality of modular sections with the horizontal and/or vertical connecting elements.

In order that the footprint of the load handling device occupies a footprint of substantially only a single grid space or cell, preferably, the open frame structure defines a volume for housing a container receiving space. The container receiving space is a space for housing a container in the open frame structure of the load handling device such that the load handling device is able to move on the tracks or grid structure. The three dimensional open frame structure defines a volume having an upper portion and a lower portion, the upper portion housing the auxiliary components of the load handling device, namely the power source, control unit and the wheel positioning mechanism and the lower portion housing the container receiving space.

One of the advantages of a load handling device being built from a plurality of connecting blocks connected together to form multiple rectangular frames and vertically stacked to form an open frame structure is that the connecting blocks not only provide a structural component to the load handling device but also a functional component. In other words, each of the at least four connecting blocks of each of the plurality of modular section is a separate connecting block that provides both a structural and functional component of the load handling device. This removes the need to have a separate structural component that provides the structural integrity of the load handling device and separate functional components for the operation of the load handling device on the grid structure, since one or more of the connecting blocks can combine both the structural and functional aspects of the load handling device. Having one or more of the connecting blocks of the open frame structure include both structural and functional components of the load handling device also reduces the weight of the load handling device since the number of parts in constructing the load handling device of the present invention is reduced.

In an aspect of the present invention, one or more of the at least four connecting blocks in one or more of the modular sections provides at least a portion of the function of the load handling device, the function being any one of the container lifting mechanism, the wheel assembly, the wheel positioning mechanism, and/or the electrical components. Optionally, one or more of the at least four connecting blocks of the one or more of the plurality of modular sections comprises one or more mounts for a pulley. Optionally, one or more of the at least four connecting blocks of the one or more of the plurality of modular sections comprises one or more mounts for a motor.

Optionally, at least a portion of the lifting mechanism, and/or the wheel assembly, and/or the wheel positioning mechanism and/or the electrical components are integrally formed from one or more of the at least four one or more of the at least four connecting blocks of one or more of the plurality modular sections comprises at least a portion of the lifting mechanism, and/or the wheel assembly, and/or the wheel positioning mechanism and/or the electrical components.

One or more of the connecting blocks of one or more of the plurality modular sections, i.e. at least a portion of the open frame structure, is integrally formed with at least a portion off the lifting mechanism, and/or the wheel assembly, and/or the wheel positioning mechanism and/or the electrical components. For example, the mounts for mounting each of the wheels of the wheel assembly can be integrally formed with one or more of the at least four connecting blocks.

Preferably, each wheel of the wheel assembly is mounted on a wheel mount. Optionally, the wheel mount is integrally formed from a connecting block of a given modular section. In an aspect of the present invention, a connecting block of the given modular section comprises a first wheel mount for a wheel of the first set of wheels and a second wheel mount for a wheel of the second set of wheels, the first and second wheel mounts comprising a plurality of bosses along an edge of the first and second mounts, each of the plurality of bosses of the first and second wheel mounts comprises an opening that are axially aligned along an wheel positioning axis (the wheel positioning axis being substantially a vertical axis), the plurality bosses of the first and second wheel mounts are spaced apart such that the plurality of bosses of the first and second wheel mounts interdigitate and the openings in each of the interdigitated bosses of the first and second wheel mounts being axially aligned along the wheel positioning axis to receive the vertical connecting element through their respective bosses, the spacing between the bosses of the first and second wheel mounts being sufficiently spaced apart so as to allow the first wheel mount to move independently of the second wheel mount along the wheel positioning axis. The wheel mount having a first wheel mount for a wheel of the first set of wheels and a second wheel mount for a wheel of the second set of wheels allows wheels mounted on their respective first and second wheel mounts to move independently along a vertical axis with respect to each other to engage and disengage from the grid structure. The wheel mounts operate in conjunction with the wheel positioning mechanism to change direction of the load handling device on the grid structure.

Optionally, the wheel positioning mechanism comprises a cam mechanism wherein one or more of the at least four connecting blocks comprises at least a portion of the cam mechanism. Optionally, the at least portion of the cam mechanism is integral with the one or more of the at least four connecting blocks.

In a further aspect of the present invention, the open frame structure provides a physical support for at least a portion of any one of the container lifting mechanism, the wheel assembly, the wheel positioning mechanism, and/or the electrical components. For example, the horizontal connecting elements extending between opposing connecting blocks can be used to physically mount one or more functional components of the load handling device. Optionally, the container lifting mechanism comprises:

a) a first set of spools and a second set of spools, each spool of the first set of spools and second set of spools carrying a lifting tether having a first end anchored to the container-gripping assembly and a second end anchored to the spool, b) a rotatable shaft, wherein the first and/or second set of spools are mounted to the rotatable shaft such that the rotatable shaft is common to the first and/or second sets of spools;

c) the drive mechanism comprising a drive pulley mounted to the rotatable shaft common to the first and/or second sets of spools such that rotation of the rotatable shaft by the drive pulley drives rotation of the first and/or the second sets of spools.

Preferably, the rotatable shaft is mounted to the one or more horizontal connecting elements connecting two adjacent connecting blocks. Preferably, the rotatable shaft extends between opposing horizontal connecting elements connected to the connecting blocks.

Optionally, any one of the lifting mechanism, and/or the wheel assembly, and/or the wheel positioning mechanism, and/or the electrical components can be shared amongst two or more of the plurality of modular sections. For example, the wheel positioning mechanism comprises a cam mechanism comprising a cam having a cam profile having a highland part and a valley part, a cam follower, and a traveller for moving the cam follower along the cam profile so as to convert movement of the cam along the cam profile to a vertical movement. The cooperation between the cam, the cam follower, and the traveller can be shared amongst two or more of the plurality of modular sections. Optionally, a plurality of vertically adjacent rectangular frames defines a volume for housing at least a portion of the container lifting mechanism, and/or the wheel assembly, and/or the wheel positioning mechanism, and/or the electrical components. Optionally, one or more of the at least four connecting blocks of one or more of the plurality of rectangular frames of the open frame structure is 3D printed. Optionally, the at least four connecting blocks of each of the plurality of rectangular frames are 3D printed (e.g. formed by additive manufacturing).

The number of modular sections in a vertical stack can be made dependent on the functions of the load handling device. By having modular sections, the functional characteristics of the load handling device can be changed by changing the number of modular sections in the stack. In an aspect of the present invention, the plurality of modular tier sections in order of increasing height of the load handling device comprises a first, second, third and fourth modular tier sections, the first modular tier section being at the bottom of the load handling device, and the fourth modular tier section being at the top of the load handling device. For the load handling device to move on the grid structure, preferably, the first modular section comprises the wheel assembly. For the open frame structure of the load handling device to provide a container receiving space, preferably, the fourth modular section comprises one or more cradles for supporting the electrical components. Optionally, the one or more cradles are mounted to one or more of the horizontal connecting elements connecting two adjacent connecting blocks of the fourth modular section.

A further aspect of the present invention provides a method of construction of a load handling device, comprising the steps of:
  i) forming a rectangular frame by linking together at least four connecting blocks by one or more horizontal connecting elements;
  ii) linking a plurality of rectangular frames together in a vertical stack by connecting the connecting blocks of vertically adjacent rectangular frames by one or more vertical connecting elements to form an open frame structure, the open frame structure supporting;
  a) a container lifting mechanism comprising a grabber device configured to releasably grip a container and a drive mechanism configured to raise and lower the grabber device;
  b) a wheel assembly arranged to support the vehicle body, the wheel assembly comprising a first set of wheels for engaging with a first set of grid members to guide movement of the load handling device in a first direction and a second set of wheels for engaging with a second set of grid members to guide the movement of the load handling device in a second direction, wherein the second direction is transverse to the first direction, each wheel of the first and second sets of wheels are mounted on a wheel mount;
  c) a wheel positioning mechanism configured for selectively lowering or raising the first set of wheels or the second set of wheels into engagement or disengagement with the first set of tracks or rails or the second set of tracks or rails.

Optionally, the open frame structure further supports one or more electrical components, the one or more electrical components comprising a power source and/or a processor for controlling the container lifting mechanism and wheel positioning mechanism.

Optionally, the open frame structure is formed by inserting one or more of the plurality of horizontal and/or vertical connecting elements into an opening in one or more of the at least four connecting blocks. Optionally, the method further comprises the step of attaching at least a portion of the lifting mechanism, and/or the wheel assembly, and/or the wheel positioning mechanism and/or the electrical components to the open frame structure.

To reduce the weight of the load handling device, and thus the ease of build of the load handling device according to the present invention, the method further comprises the step of integrally forming at least a portion of the container lifting mechanism, and/or the wheel assembly, and/or the wheel positioning mechanism from one or more of the at least four connecting blocks of the open frame structure. By integrally forming at least a portion of the functional components of the load handling device from the open frame structure, more specifically from one or more of the connecting blocks of the open frame structure, the number of components needed to construct the load handling device with the desired functional characteristics of the load handling device operable on the grid framework structure reduces. To capture the different complex shapes of the at least portion of the container lifting mechanism, the wheel assembly, and the wheel positioning mechanism, optionally, one or more of the connecting blocks of the at least four connecting blocks of one or more of the plurality of rectangular frames are formed by 3D printing or additive manufacturing.

DESCRIPTION OF DRAWINGS

Further features and aspects of the present invention will be apparent from the following detailed description of an illustrative embodiment made with reference to the drawings, in which.

DETAILED DESCRIPTION

Figure 1:
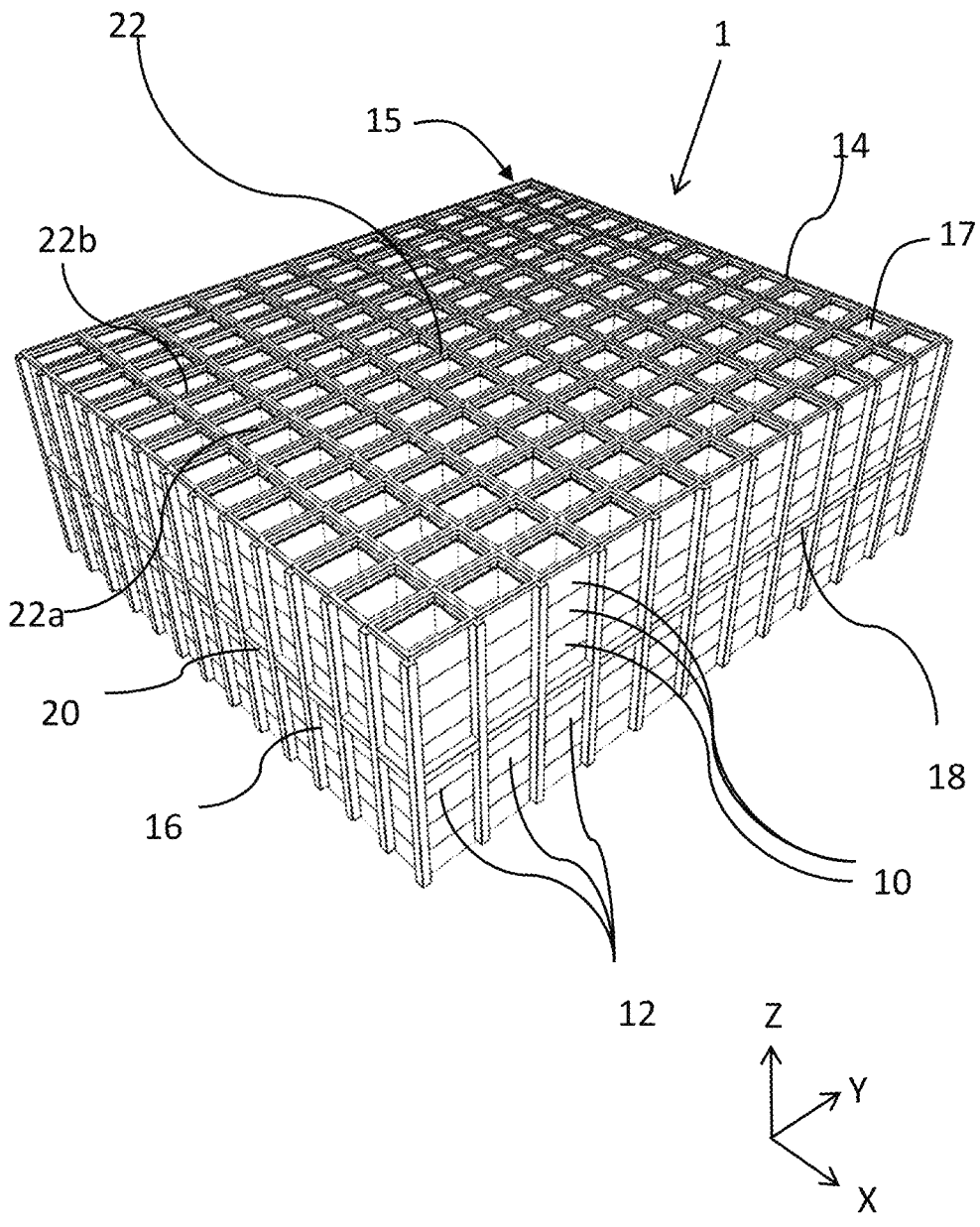
FIG. 1 is a schematic diagram of a grid framework structure according to a known system.
Figure 2:
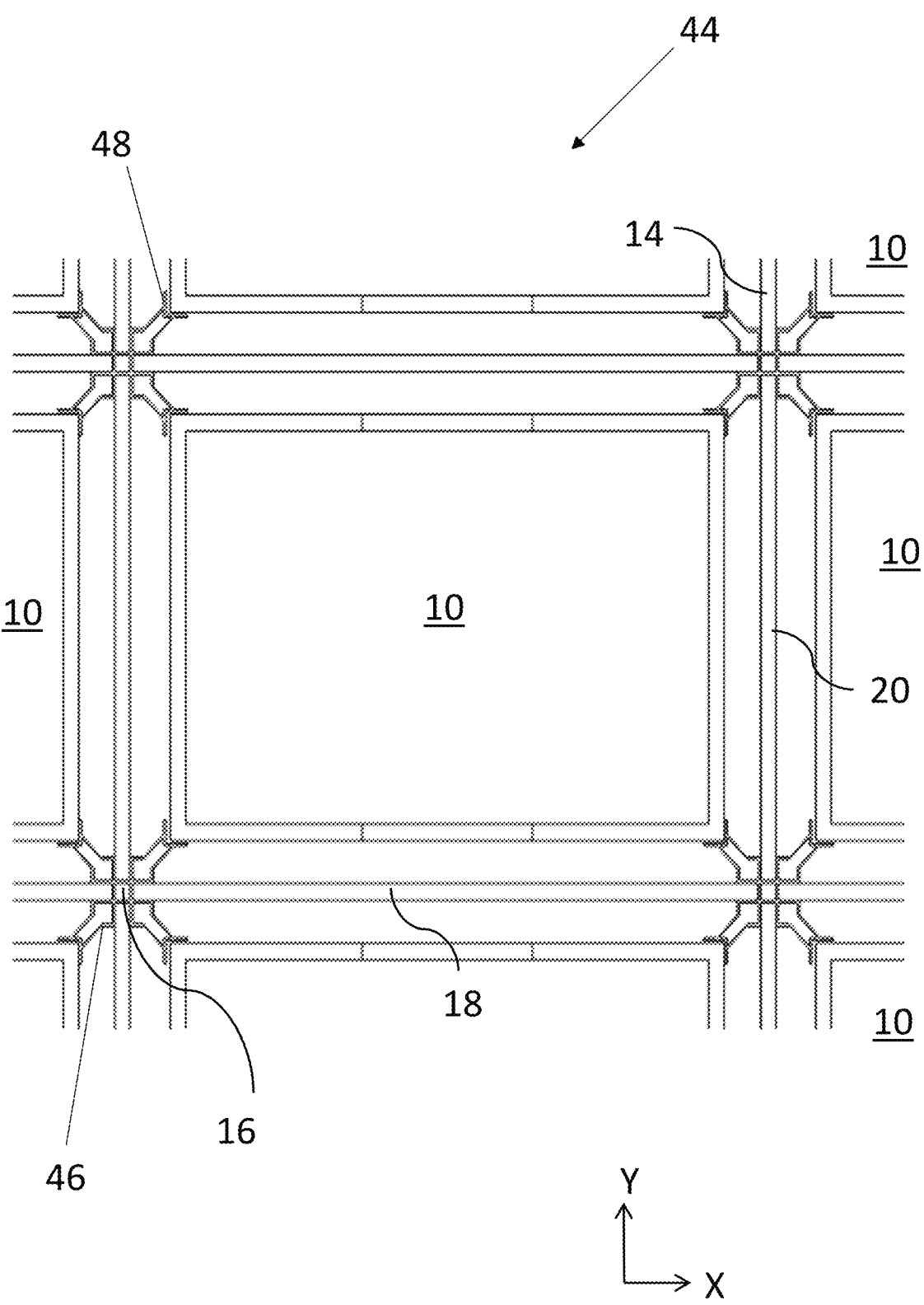
FIG. 2 is a schematic diagram of a top down view showing a stack of bins arranged within the framework structure of FIG. 1.
Figure 3:
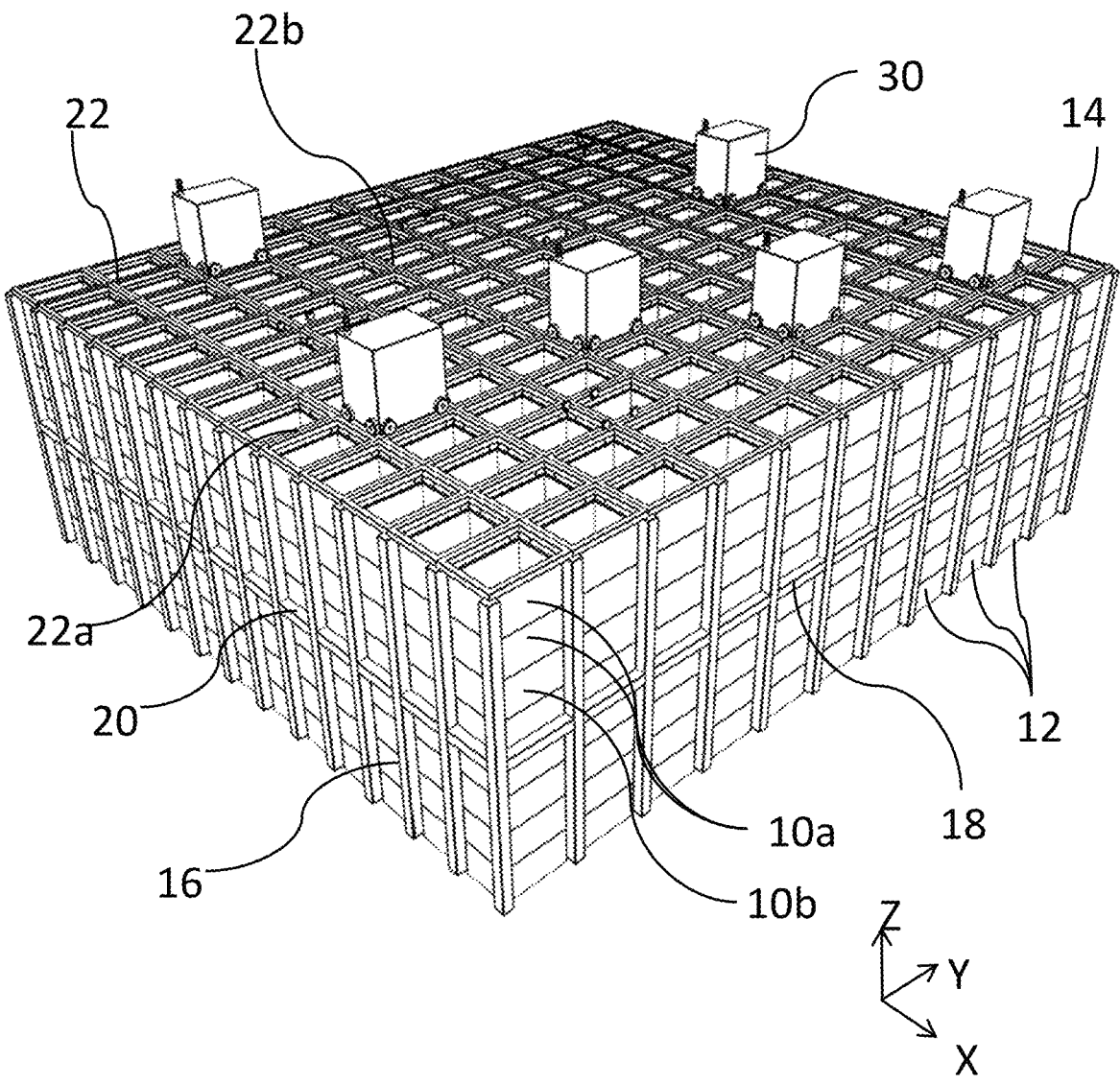
FIG. 3 is a schematic diagram of a known storage system of a load handling device operating on the grid framework structure.
Figure 4:
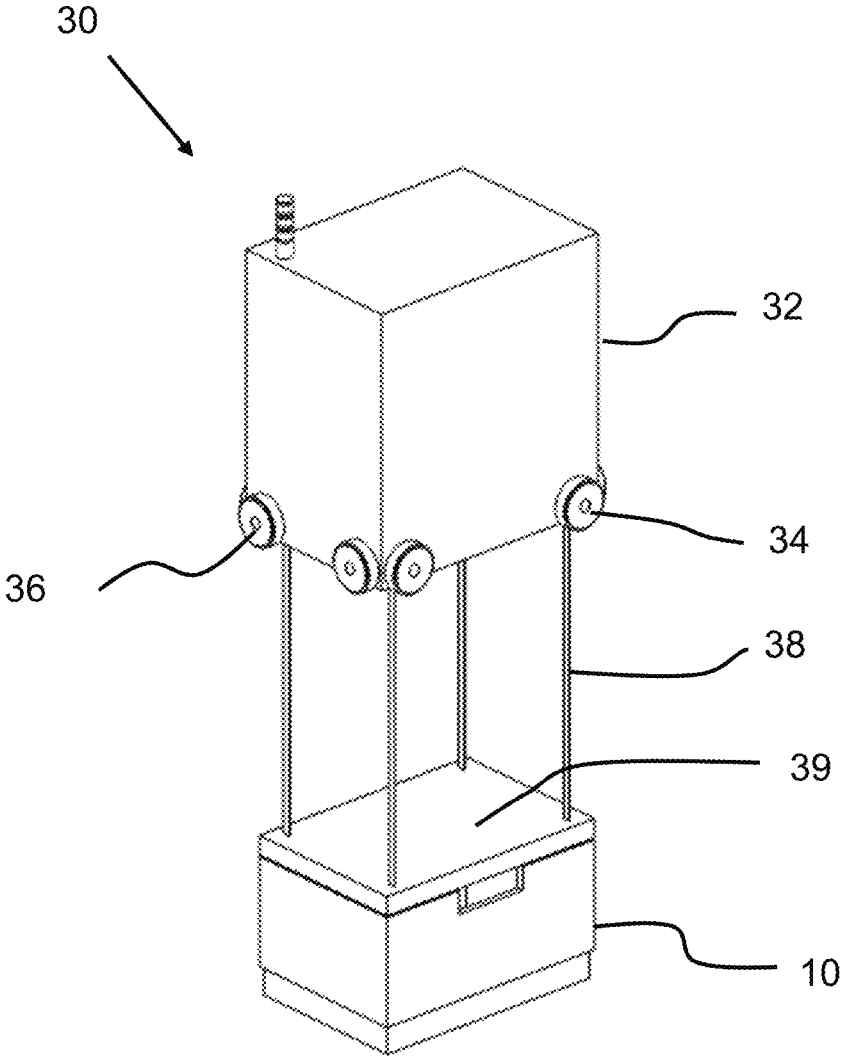
FIG. 4 is a schematic perspective view of the load handling device showing the lifting device gripping a container from above.
Figure 5:
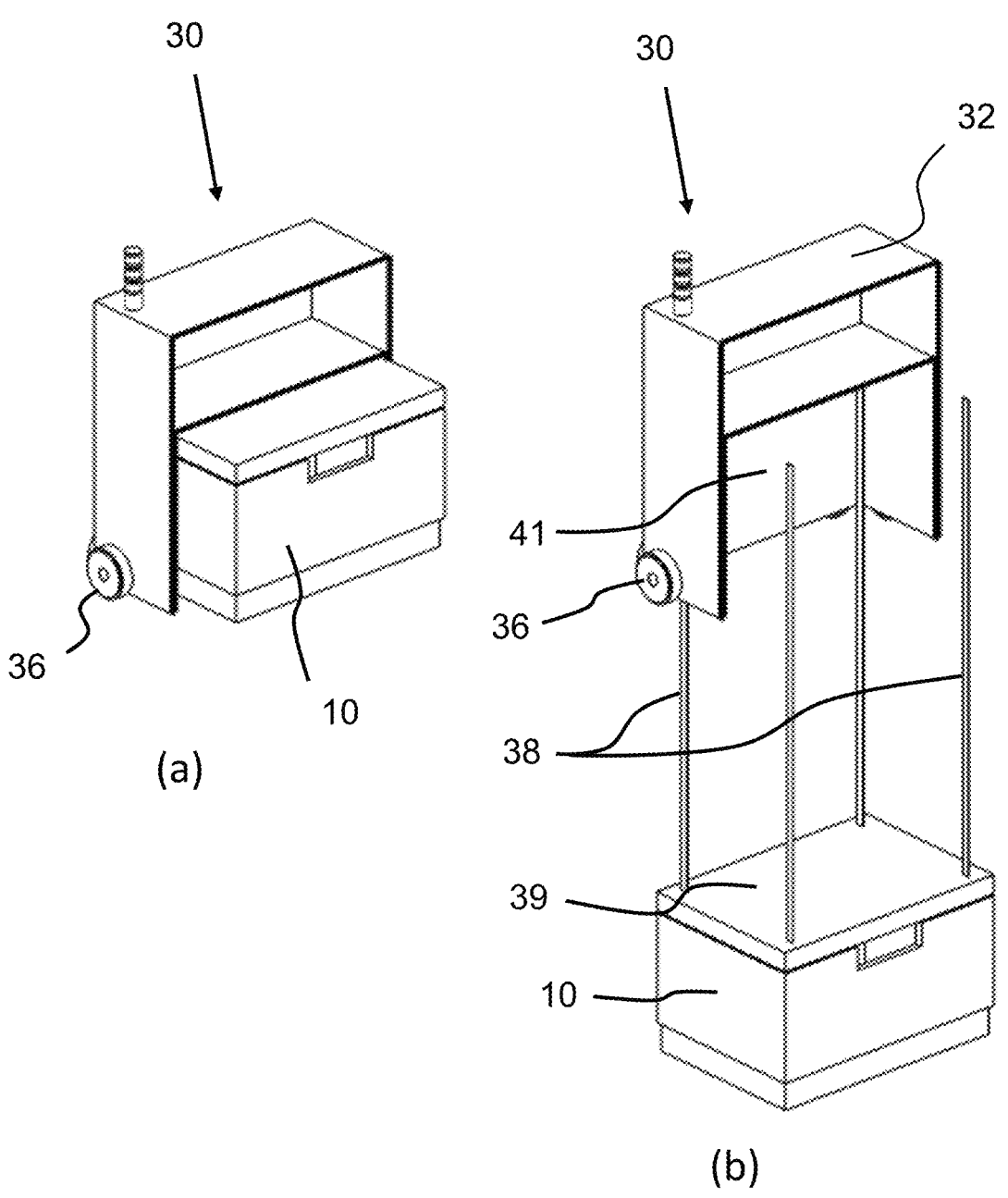
FIGS. 5(a) and 5(b) are schematic perspective cut away views of the load handling device of FIG. 4 showing (a) a container accommodated within the container receiving space of the load handling device and (b) the container receiving space of the load handling device.
Figure 6:
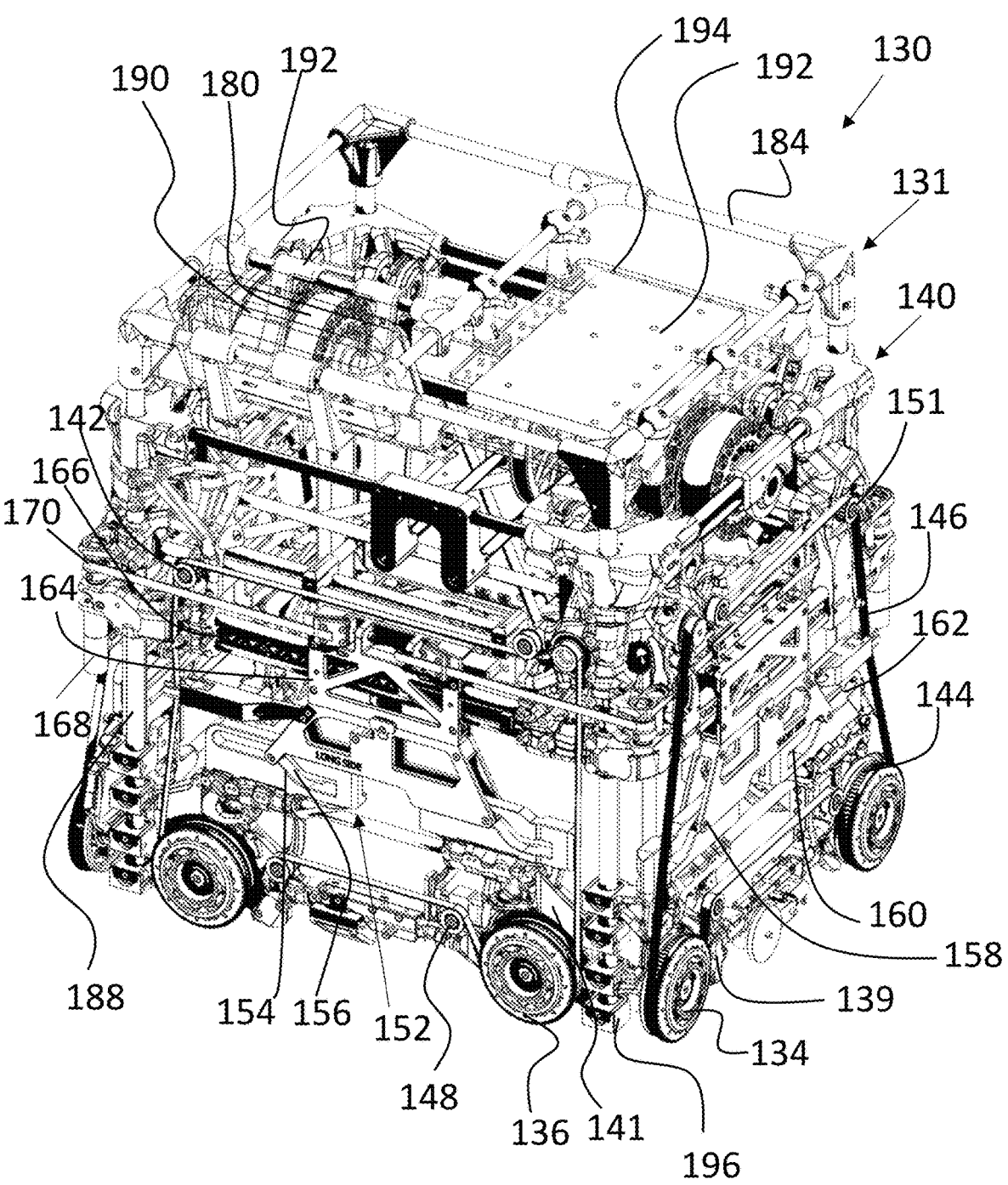
FIG. 6 is a schematic drawing of the load handling device according to an embodiment of the present invention.

It is against the known features of the storage system such as the grid framework structure and the load handling device described above with reference to FIGS. 1 to 5, that the present invention has been devised. FIG. 6 is a schematic drawing of an example of a load handling device 130 according to the present invention. A typical load handling device in the art comprises a separate rigid framework or chassis and the functional components of the load handling device such as the lifting mechanism, wheel positioning mechanism, wheel assembly. wheel drive assembly and the electrical components, e.g. rechargeable power source and/ or control unit are literally fixed or mounted to the framework. Fixing includes various fasteners such as bolts, screws and/or welding. The framework is usually in the form of a tower having a height that is representative of the height of the load handling device. To ensure the structural integrity of the rigid framework to bear the weight of the various functional components of the load handling device, the rigid framework is commonly constructed from metal, e.g. aluminium or stainless steel. Cladding is fixed to the outside of the framework to form a vehicle body housing the functional features of the load handling device. The accumulation of the weight of the rigid framework and the various functional components of the function of the load handling device results in a load handling device having a weight in excess of 150 kg. In comparison to the load handling device in the art, the load handling device does not have any cladding and largely comprises an open frame structure.

Figure 8:
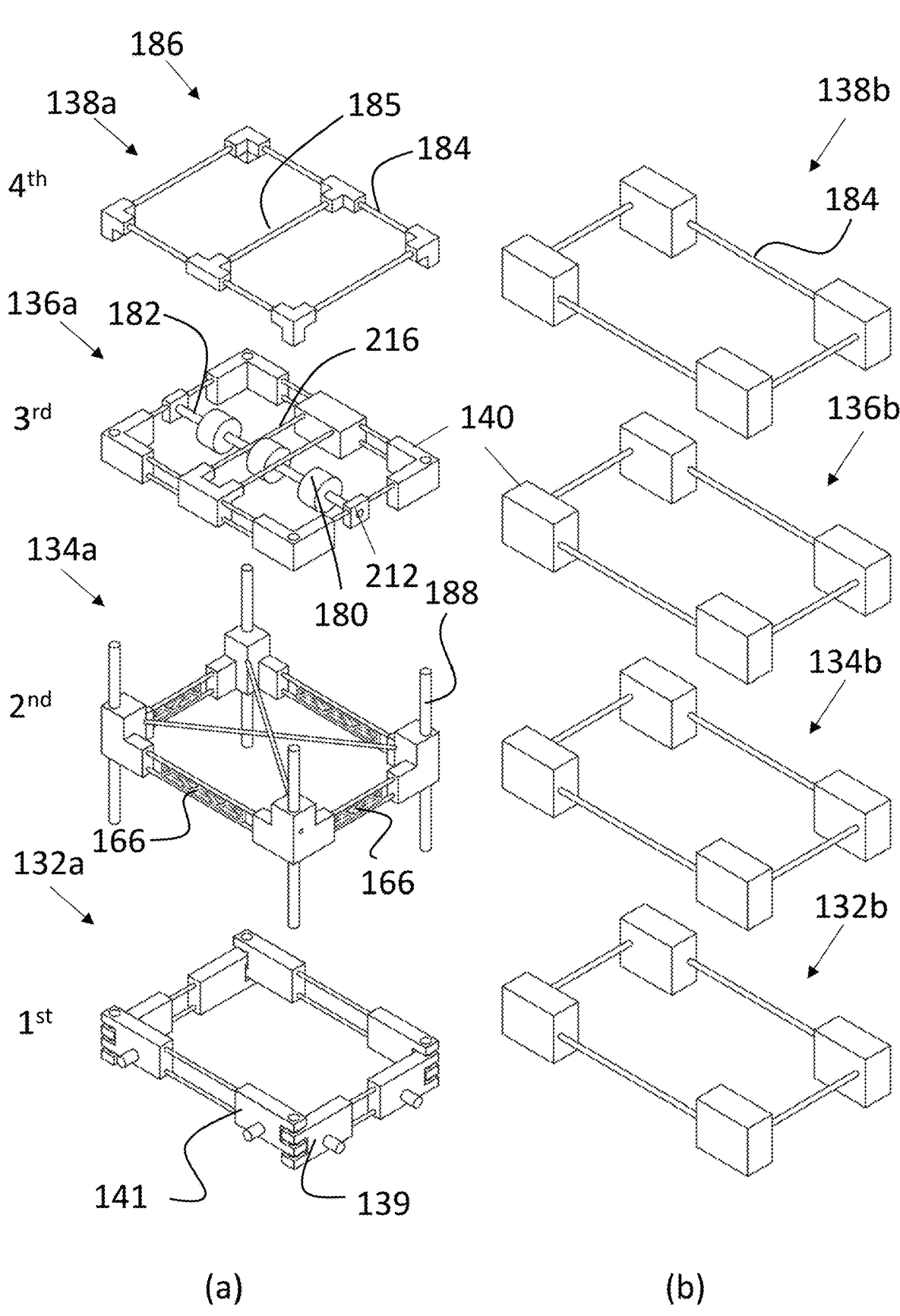
FIGS. 8(a and b) are schematic drawings of (a) the different modular sections of the load handling device shown in FIG. 7; and (b) an analogy of the different modular sections as separate rectangular frames formed by four connecting blocks.

In accordance with an embodiment of the present invention, the construction of the load handling device 130 according to the present invention shown in FIG. 6 is based around the principle of having a modular system comprising a plurality of modules or modular sections that are connectable in a vertical stack to provide the different functional characteristics of the load handling device. In a further aspect of the present invention, the modular system is integrated into an open frame structure or skeleton 131 such that the open frame structure comprises a plurality of modular frames that are connectable to one another in a vertical stack to provide the different functional characteristics of the load handling device. The term "open frame structure" and "skeleton" are used interchangeably in the patent specification to mean the same feature. In yet a further aspect of the present invention at least a portion of the functional components of the load handling device are integrally formed within the open frame structure of the load handling device. An example of a load handling device 130 incorporating the inventive concepts of the present invention is shown in FIG. 6 and the different modular sections providing the different functional characteristics of the load handling device are shown in FIGS. 8(*a* and *b*). The different modular sections 132(*a* and *b*), 134(*a* and *b*), 136(*a* and *b*), 138(*a* and *b*) are labelled, $1^{st}$, $2^{nd}$, $3^{rd}$ and $4^{th}$ modular sections respectively in FIGS. 8(*a* and *b*). As can be appreciated from the exploded view of the load handling device shown in FIGS. 8(*a* and *b*), the different modular sections of the load handling device comprise connection points 140 at the corners of the modules 132(*a* and *b*), 134(*a* and *b*), 136(*a* and *b*), 138(*a* and *b*) to enable the different modular sections to be vertically stacked.

In the particular embodiment of the present invention shown in FIGS. 8(*a* and *b*), four modular sections 132(*a* and *b*), 134(*a* and *b*), 136(*a* and *b*), 138(*a* and *b*) are shown a connectable in a vertical stack to form a tier based modular system. Starting from the bottom modular section 132(*a* and *b*) and increasing in height of the load handling device, the four modular sections for the purpose of explanation of the present invention are labelled first 132(*a* and *b*), second 134(*a* and *b*), third 136(*a* and *b*) and fourth 138(*a* and *b*) modular sections. The four modular sections provide the different functional characteristics of the load handling device. In the particular embodiment of the present invention, the different functional characteristics of the load handling device can be shared amongst one or more of the modular sections 132(*a* and *b*), 134(*a* and *b*), 136(*a* and *b*), 138(*a* and *b*) of the load handling device 130. For example, the wheel positioning mechanism and the wheel drive assembly can be shared amongst two or more modular sections of the load handling device. The number of modular sections is not limited to four modular sections and the different functional characteristics of the load handling device can be divided amongst any number of modular sections.

The different functional characteristics of the load handling device include but are not limited to the wheel assembly for allowing movement of the load handling device on the grid structure or tracks, the wheel drive assembly to drive the wheel assembly to enable the load handling device to move on the grid structure, the wheel positioning mechanism, otherwise known as the directional change mechanism, the container lifting mechanism for picking up and dropping off a container to and from a grid cell of the grid framework structure, and the electrical or electronic components of the load handling device. As discussed above in the introductory part of the patent specification, the electrical components can optionally comprise a control unit for controlling the operation of the wheel drive assembly, the wheel positioning mechanism and the drive mechanism of the container lifting mechanism. Typically, the wheel drive assembly. the wheel positioning mechanism and the drive mechanism of the container lifting mechanism comprise one or more electrical motors. Other components of the electrical components of the load handling device include but are not limited to the power source for providing power to drive the wheel drive assembly and the drive mechanism of the container lifting mechanism. Typically, the power source is a rechargeable power source or battery. Examples of rechargeable batteries are Lithium-Ion battery, Nickel-Cadmium battery, Nickel-Metal Hydride battery, Lithium-Ion Polymer battery, Thin Film battery and Smart battery Carbon Foam-based Lead Acid battery.

For ease of explanation of the present invention, in particular the architecture of the open frame structure, the different functional characteristics of the load handling device 130 shown in FIG. 6 is explained first. However, the present invention is not limited to the examples of the different functional characteristics of the load handling device described below and other examples that can provide the same functional characteristics of the load handling device are applicable in the present invention. The explanation of the functional characteristics of the load handling device is for the purpose of providing an example of the functional characteristics of the load handling device.

Wheel Assembly

As shown in FIG. 6, the wheel assembly comprises a pair of wheels at the front and a pair of wheels at the rear of the load handling device 130. For simplicity of explanation, the wheel assembly comprises a pair of wheels at the front of the load handling device and a pair of wheels at the rear of the load handling device, collectively is termed a first set of wheels 134. The first set of wheels 134 are orientated so that the load handling device is able to move in a first direction, i.e. X Cartesian direction. Similarly to the first direction, to move in a second direction, the second direction being substantially perpendicular to the first direction, i.e. Y Cartesian direction, so that the load handling device can move in both X-Y directions on the grid structure, the wheel assembly comprises pairs of wheels on either side of the load handling device, and for simplicity of explanation these wheels are termed a second set of wheels 136. Thus, to move in the first direction on the grid structure, the first set of wheels 134 engage with the grid structure and the second set of wheels 136 disengage from the grid structure. Similarly, to move in the second direction, the first set of wheels 134 disengage from the grid structure and the second set of wheels 136 engage with the grid structure. The wheels are rotatably mounted to the open frame structure 131 via one or more wheel mounts 139, 141 (see FIG. 8) and are configured to engage with the grid structure to allow the load handling device to move along the grid structure in both X and Y directions.

To enable the load handling device to move in the first and second directions on the grid structure, the load handling device further comprises a wheel drive assembly that is configured to drive each of the wheels of the wheel assembly.

Wheel Drive Assembly

In the particular example of the present invention, each of the first and second sets of wheels are driven by one or more motors (not shown) via a drive belt assembly 140 described in the PCT Application PCT/EP2021/055372 in the name of Ocado Innovation Limited, the details of which are incorporated herein by reference. In the particular embodiment shown in FIG. 6, a drive belt assembly 140 is provided for each set of wheels and comprises a drive belt pulley gear arrangement 142 for engaging with an edge of a pair of wheels 134, 136 on one side of the load handling device. The rim of the pairs of wheels comprises a plurality of gear teeth 144 for cooperating with a drive belt 146. A toothed drive belt engages with both of the wheels. The drive belt 146 is guided by a slave-wheel 148 mounted to the open frame structure 131 of the load handling device 130, and two tensioning wheel arrangements 150. The tensioning wheel arrangements 150 are movably mounted to the open frame structure 131 with springs (not shown), and are intended to keep the drive belt 146 taut and maintain engagement of the drive belt with the wheels. A drive wheel 151 is provided, mounted to the open frame structure 131. The drive wheel 151 is driven by a pulley and gear arrangement 142 which is linked to an axle or drive shaft of a motor (not shown in FIG. 6). Rotation of the drive wheel 151 by the motor drives a pair of wheels by being connected the drive belt 146. The wheel drive assembly is provided for each of the pair of wheels of the first 134 and second 136 set of wheels. Thus, each of the pairs of wheels of the first set of wheels 134 are driven in synchronization by their respective drive assemblies to move the load handling device in the X direction on the grid structure. Similarly, each of the pairs of wheels of the second set of wheels 136 are driven in synchronization by their respective drive assemblies to move the load handling device in the Y direction on the grid structure.

The drive wheels 151 on opposed sides of the load handling device 131 may share a common motor axle so that each pair of drive wheels 151 is driven at the same time and at the same speed. As a result only a single motor is required to drive the load handling device 130 forward and reverse in a first x-direction, and only a single motor is required to drive the load handling device 130 forward and reverse in a second y-direction. This arrangement may advantageously reduce the cost in terms of space in the load handling device and the number of parts required. The first set of wheels 134 and the second set of wheels 136 may be selectively driven under the control of the load handling device.

Whilst the particular example of the wheel drive assembly in FIG. 6 comprises a drive belt assembly 140 driven by a motor, other arrangements of driving the first and second sets of wheels are applicable in the present invention. For example, it will be appreciated that it may be possible to drive the load-handling device using four motors for each of the first and second direction. For example, all of the wheels in the first and second set of wheels can be driven by individual hub motors comprising an outer rotor that is configured to rotate about an inner hub.

In detail, the outer rotor comprises an outer surface that is arranged to engage with the grid structure (e.g. tracks) and an inner surface comprising ring shaped permanent magnets that is arranged to rotate around a wheel hub or the inner hub comprising the stator of the hub motor. Typically, the stator comprises the coils of the hub motor. To drive each wheel of the first 134 or second 136 set of wheels and thus, move the load handling device 130 in the first direction or the second direction on the grid structure, the outer rotor of the hub motor is arranged to rotate about an axis of rotation that corresponds to the central axis of a respective wheel. The outer surface of the rotor can optionally comprise a tyre for engaging with the tracks or rails.

Wheel Positioning Mechanism

To enable the load handling device 130 to move on the different wheels 134, 136 in the first and second directions, the load handling device 130 includes a wheel-positioning mechanism or directional change mechanism for selectively engaging either the first set of wheels 134 with a first set of tracks 22a or the second set of wheels 136 with a second set of tracks 22b. The wheel-positioning mechanism is configured to raise and lower the first set of wheels 134 and/or the second set of wheels 136 relative to the open frame structure 131 of the load handling device 130, thereby enabling the load-handling device 130 to selectively move in either the first direction or the second direction across the tracks of the grid framework structure 1.

The wheel-positioning mechanism may include one or more linear actuators, rotary components or other means for raising and lowering at least one set of wheels 134, 136 relative to the open frame structure 131 of the load handling device 130 to bring the at least one set of wheels 134, 136 out of and into contact with the tracks. In some examples, only one set of wheels is configured to be raised and lowered, and the act of lowering the one set of wheels may effectively lift the other set of wheels clear of the corresponding tracks while the act of raising the one set of wheels may effectively lower the other set of wheels into contact with the corresponding tracks. In other examples, both sets of wheels may be raised and lowered, advantageously meaning that the body or open frame structure 131 of the load handling device 130 stays substantially at the same height and therefore the weight of the body or open frame structure 131 and the components mounted thereon does not need to be lifted and lowered by the wheel-positioning mechanism.

In the particular embodiment of the present invention, the wheel positioning mechanism comprises a cam mechanism 152 on each side face of the load handling device 130. In FIG. 6, a cam mechanism 152 is shown on the visible X-direction side, and a similar cam mechanism 152 is arranged on the opposing X-direction side (not shown). Similarly, a cam mechanism 152 is shown on the visible y-direction side, and a similar cam mechanism 152 is arranged on the opposing y-direction side (not shown). In other words, the cam mechanism 152 on each side face of the load handling device 130 is configured to raise and lower the pair of wheels relative to the open frame structure 131 of the load handling device 130. Each cam mechanism 152 on opposing side faces of the load handling device is configured to raise and lower respective pairs of wheels of the first 134 or second 136 set of wheels in synchronization relative to the open frame structure 131 of the load handling device 130 in order to move the load handling device in the X or Y direction on the grid structure. In detail, the cam mechanism 152 comprises a cam 154 having a cam profile 156 and a cam follower 158 engageable with the cam profile 156. In the particular embodiment of the present invention shown in FIG. 6. the cam follower 158 is a roller which freely rotates about a rotation shaft or spigot. The cam follower 158 is configured to move along the longitudinal direction of the cam profile 156.

The cam 154 comprises a slot having a profile 156 extending longitudinally along the slot between a first or lower limit 160 (valley part) and a second or upper limit 162 (highland part). Between the limits, the slot extends from the lower limit 160 substantially horizontally, slopes upwards and then continues substantially horizontally to the upper limit 162 with enough space to accommodate the cam follower 158. Movement of the cam follower 158 from the lower limit 160 to the upper limit 162 moves the one or more wheels of the first 134 or second 136 set of wheels in an upward direction to disengage with the tracks. Similarly, movement of the cam follower 158 from the upper limit 162 to the lower limit 160 moves the one or more wheels of the first 134 or second 136 set of wheels in a downward direction to engage with the tracks. One or more wheels of the first 134 or second 136 set of wheels can be coupled either to the cam 154 or cam follower 156 via its respective wheel mount such that movement of the cam follower 156 relative to the cam 154 lowers and raises the one or more wheels of the first 134 or second 136 sets of wheels.

A pair of wheels at same side of the loads handling device can share the same cam and cam follower such that movement of the cam follower along the cam raises or lowers the pair of wheels simultaneously. The pair of wheels at opposing sides of the load handling device represent the first sets of wheels for moving the load handling device in the X direction and the pair of wheels at the other opposing sides of the load handling device represent the second of wheel for moving the load handling device in the Y direction. In other words, the cam mechanism provide a single cam arrangement where a pair of wheels at the side of the load handling device of the first or second sets of wheels is lowered or raised by the same cam and cam follower. However, in the particular embodiment of the present invention shown in FIG. 6, the cam mechanism 152 employs a double cam arrangement rather than a single cam arrangement on each side face of the load handling device. A first cam and a second cam are arranged horizontally adjacent. The first cam profile and the second cam profile are substantially identical. Likewise, a pair of followers and are arranged to engage with the respective cams. Instead of a single cam arrangement to raise and lower a pair of wheels, the double cam arrangement on one side face of the load handling device thus provides movement of a pair of wheels on one side face of the load handling device in the raised and lowered position. The use of a double cam arrangement rather than a single cam arrangement on each side face of the load handling device maintains the horizontal orientation of a pair of wheels of the first or second sets of wheels when moving in a raised or lowered position. However, the cam mechanism is not limited to a double cam arrangement on each side face of the load handling device and can comprise a single cam arrangement on each side face of the load handling device.

To move the cam follower 158 relative to the cam 154, in the particular embodiment of the present invention, the cam mechanism 152 comprises a traveller 164 that is configured to move along a side face of the load handling device. Coupled to the traveller 164 is the cam follower 158 such that movement of the traveller 164 along one side of the load handling device 130 raises and lowers one or more wheels of the first 134 or second 136 sets of wheels. The traveller 164 can be configured to move along a rail 166 (see FIG. 8) on each side of the load handling device such that movement of the traveller 164 along the rail 166 moves the cam follower 158 along the cam 154 which in turn raises a pair wheels of the first or second sets of wheels when the cam follower is at the upper limit 162 and lowers one or more wheels when the cam follower is at the lower limit 160 of the cam 154. In the particular example of the present invention, the rail 166 for supporting the traveller 164 is integrally formed from the open frame structure 131 of the load handling device 130.

The traveller 164 is configured to move along the rail 164 by a cam drive mechanism comprising a cam motor 168 coupled to the traveller 164 via one or more pulleys, spools, belts, and/or gears to move the traveller along one side face of the load handling device. In the particular embodiment of the present invention, the motor 168 is configured to move the traveller 164 along one side of the load handling device by a cam belt 170 having one end anchored to the cam motor 168 and the other end anchored to the traveller 164. The cam belt 170 is wound on a cam spool mounted to the drive shaft of the cam motor 168 such that rotation of the cam spool by the cam motor 168 provides a pulling force on the cam belt 170, which in turn causes the traveller 164 anchored to the cam belt 170 to move along the rail 166. To return the traveller 164 to its initial position, a second motor can provide an opposite pulling force on the traveller 164 to pull the traveller in the opposite direction. Alternatively, the traveller can be biased by a biasing force (e.g. spring) towards a first position corresponding to the lower or upper limits of the cam profile and the motor is configured to provide a pulling force on the traveller against the biasing force to move the traveller towards a second position corresponding to the upper limit or lower limit of the cam profile. To provide the necessary anchorage to raise and lower a pair of wheels relative to the open frame structure of the load handling device, preferably the cam motor 168 is mounted to the open frame structure 131.

To provide synchronized movement of the first or second sets of wheels to move in the X or Y direction on the grid structure, the corresponding travellers for the first or second sets of wheels on opposing side faces of the load handling device can be moved by one or more cam motors. For example, a single cam motor can provide the pulling force to raise or lower the first set of wheels 134. Similarly, a single cam motor can provide the pulling force to raise or lower the second set of wheels 136. Alternatively, two cam motors can provide opposing pulling forces on the traveller to raise and lower a respective pair of wheels of the first set of wheels or the second set of wheels. In the particular example of the present invention shown in FIG. 6, two cam motors are used to the raise and lower the first and second sets of wheels in synchronization. To provide synchronized movement of the first set of wheels and the second set of wheels, each of the two cam motors is configured to rotate in both in a clockwise and anti-clockwise direction. A plurality of cam belts 170 are wrapped around the outer periphery of the open frame structure 131 of the load handling device 130 via connection to the travellers and the cam motors 168 such that rotation of the two cam motors in a clockwise direction raises the first set of wheels 134 and lowers the second set of wheels 136. Conversely, rotation of the two cam motors 168 in anti-clockwise direction raises the first set of wheels 134 and lowers the second sets of wheels 136.

Whilst the particular example of the wheel position mechanism shown in FIG. 6 comprises a cam mechanism driven by a cam motor, other arrangements of a wheel positioning mechanism are applicable in the present invention. For example, the wheel positioning mechanism can comprise a compliant mechanism having at least one resiliently deformable member arranged to move under an applied force, e.g. a motor, to cause the wheels to raise or lower as taught in the PCT application PCT/EP2021/055335 in the name of Ocado Innovation, the details of which are incorporated herein by reference. In detail, the first and second sets of wheels can be raised clear of the rails or lowered onto the tracks or rails by means of the compliant mechanism(s) or linkage-sets mounted to the open frame structure on opposed faces of the load handling device.

The direction-change compliant mechanisms are each deformable in first and second directions. When there is no input force, the compliant mechanism is at rest or in a neutral position, i.e. the compliant mechanism is not elastically deformed, and both sets of wheels are level and are resting on a surface. In this arrangement, the load handling device is unable to move in the x- nor y-directions and the load handling device is parked. The elastic deformation of the compliant mechanism is linked to arms holding each of the wheels and movable in a vertical (or z-) direction to raise and lower the wheels.

When a first input force $F_1$ is provided, the compliant mechanism body deforms in a first direction. The displacement of the mechanism body is translated to a vertical direction to lower the first set of wheels 134, and raise the second set of wheels 136. The wheels of the first set of wheels move downwards to engage with the rails or tracks and to support the vehicle and the wheels of the second set of wheels move upwards to be clear of the tracks. Thus, the load handling device 130 may be driven in the X-direction.

When a second input force $F_2$ is provided, in a direction opposed to the first input force, the compliant mechanism body deforms in a second direction. The displacement of the mechanism body is translated to operate in a vertical direction to raise the first set of wheels 134, and lower the second set of wheels 136 so that the load handling device is supported by the second set of wheels 118 and may be driven in the y-direction.

The compliant mechanism is connected to the sets of wheels 134, 136 via a transfer linkage. Thus, in this way, the compliant mechanism provides means for changing the operational direction of travel of the load handling device 130.

Container Lifting Mechanism

To retrieve a storage container stored in the grid framework structure, the load handling device comprises a container lifting mechanism or container lifting assembly comprising a grabber device or container gripper assembly to releasably grab a storage container from a stack and lift the storage container into a container receiving space of the load handling device. A winch assembly or crane assembly comprising a plurality of lifting tethers wound on separate spools having one end fixed to the grabber device are used for lifting and lowering the grabber device. The container receiving space is sized so as to accommodate the dimensions of a storage container. The container receiving space may be within the open frame structure of the load handling device as shown in FIG. 6 or adjacent the open framework structure by a cantilever arrangement with the weight of the components housed within the open frame structure counterbalancing the weight of the storage container to be lifted by the container lifting mechanism.

Figure 7:
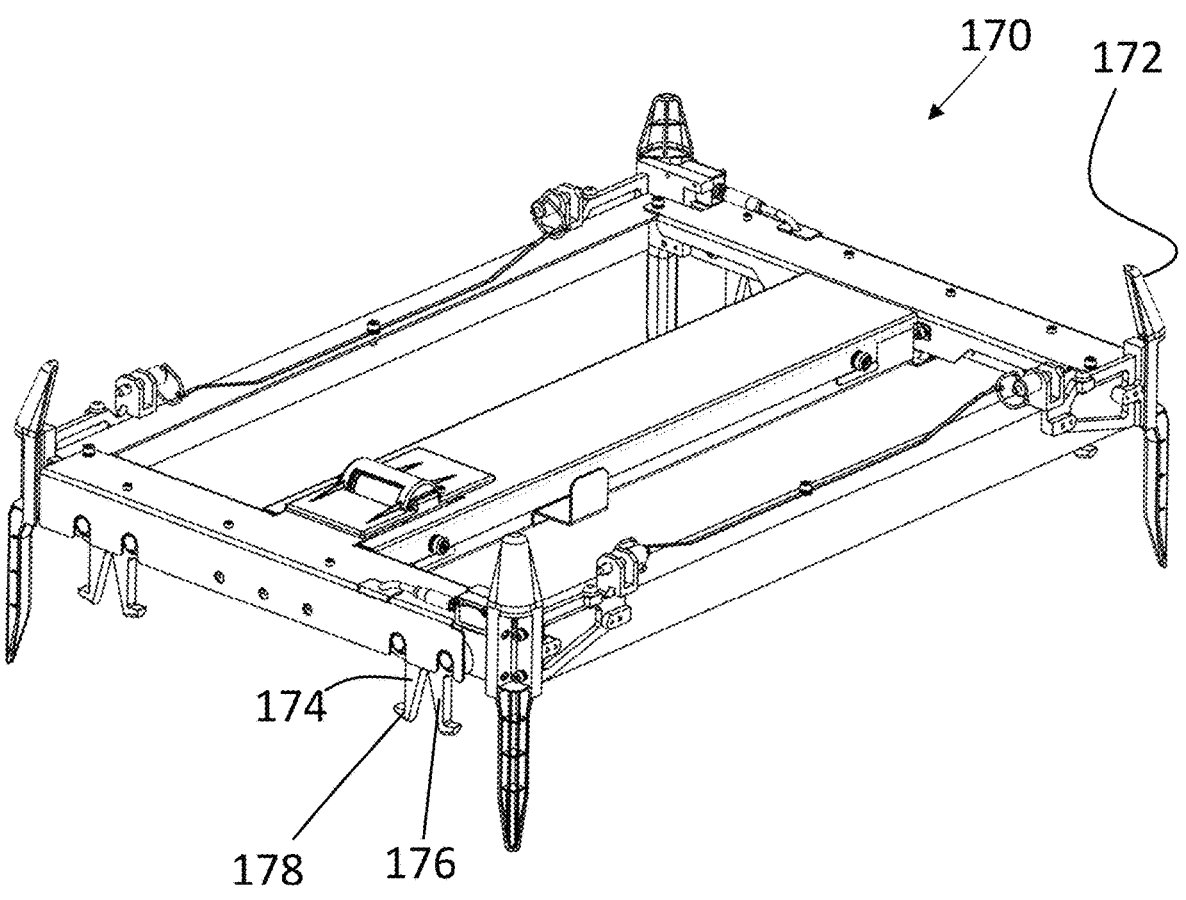
FIG. 7 is a perspective view of a grabber device for engaging with a storage container according to the present invention.

The grabber device 172 as shown in FIG. 7 is formed as a frame having four corner sections, a top side and a bottom side. The lifting mechanism is used to lift the containers into a container receiving space of the load handling device. For maximum stability and load capacity, typically, four lifting tethers 38 (see FIG. 5*b*) are used to winch the grabber device 172, with one tether disposed nearby or at each of the corners of the grabber device 170, but a different arrangement, for example with fewer tethers, could be used if desired. One end, e.g. first end, of each of the tethers is wound on a spool in the load handling device and the other end, e.g. second end, is fixed to the grabber device 172, typically at each corner of the grabber device, by a suitable bracket (not shown). The number of tethers attached to the grabber device is dependent on the ability to maintain the grabber device horizontal during operation when picking up a container 10 and the ability to withstand the tension applied to the tethers when lifting containers, which could weigh up to 40 kg, without extending or stretching, i.e. be inextensible under a predetermined applied tensile stress. To possess the necessary physical properties (Young's Modulus), the tethers are generally in the form of a cable, e.g. rope or even a tape, but other tethers with the necessary physical properties to winch containers are permissible in the present invention.

To grab a container 10, the grabber device 172 comprises four locating pins or guide pins 172 nearby or at each corner of the grabber device 172 which mate with corresponding cut outs or holes formed at four corners of the container 10 and four gripper elements 174 arranged at the bottom side of the grabber device 172 to engage with the rim of the container. The locating pins 172 help to properly align the gripper elements 174 with corresponding holes in the rim of the container.

Each of the gripper elements 174 comprises a pair of wings 176 that are collapsible to be receivable in corresponding holes in the rim of the container and an open enlarged configuration having a size greater than the holes in the rim of the container in at least one dimension so as to lock onto the container. The wings 176 can be driven into the open configuration by a drive gear. More specifically, the head of at least one of the wings comprises a plurality of teeth that mesh with the drive gear such that when the gripper elements 174 are actuated, rotation of the drive gear causes the pair of wings to rotate from a collapsed configuration to an open enlarged configuration.

When in the collapsed or closed configuration, the gripper elements 174 are sized to be receivable in corresponding holes 86 in the rim of the container. The foot of each of the pair of wings comprises a stop 178, e.g. a boss, such that when received in a corresponding hole in the rim of the container, the stop engages with an underside of the rim when in an enlarged open configuration to lock onto the container when the grabber device 170 winched upwards towards the container-receiving portion of the load handling device.

Moving on to the winch assembly of the container lifting mechanism, the winch assembly comprises a drive mechanism, and four tethers wound on four separate spools 180 (see FIG. 6). The four tethers extends downwards from their respective four spools 180 such that a lower end of each tether connects to the grabber device 170. The four spools 180 can be mounted on separate rotatable or lifting shafts or alternatively, mounted on the same or common rotatable or lifting shaft 182. In the particular embodiment of the present invention shown in FIG. 8a, the raising and lowering mechanism includes a central horizontally extending lifting shaft 182 and four spools, two spools 180 at the first end of the lifting shaft 182 and two spools 180 at the second end of the lifting shaft 182, i.e. the four separate spools carrying the lifting tethers are mounted on a single rotatable shaft 182 such that the rotatable shaft is common to all four separate spools. As a result, each of the four tethers connected to the grabber device 170 is connected to its own spool such that a single tether is wound or unwound on each spool. This advantageously ensures that the wound tethers on each spool occupy less space compared to embodiments where two or more tethers are wound onto a single spool. Providing a spool for each tether also advantageously reduces the risk of tangling of the tethers as they are wound and unwound to lift and lower the gripping device.

The lifting shaft 182 is configured to rotate so as to wind or unwind the tethers about each spool. As the lifting shaft is rotated in a first rotational direction to wind the tethers, each tether is simultaneously wound about its respective spool so as to lift the grabber device 170 (and a container when gripped by the grabber device). The lifting shaft 182 is rotated in a second rotational direction (opposite the first rotational direction), to simultaneously unwind each tether from its respective spool, thereby lowering the grabber device 170 (and a container when gripped by the grabber device). The tethers are wound or unwound simultaneously and at the same rate so as to lift or lower the grabber device 170 evenly and steadily. The lifting shaft 182 and the four pulleys for guiding each of the four lifting tethers to each of the four corners of the grabber device are mounted to the open frame structure of the load handling device.

The lifting assembly includes a motor (not shown) configured to rotate the lifting shaft 182 in the first and second rotational directions so as to wind or unwind the tethers about their spools. The motor is coupled to the central horizontally extending lifting shaft 182 so as to rotate the lifting shaft 182 in the first and second rotational directions. Various mechanisms can be used to couple the motor to the lifting shaft including but not limited to at least one of the plurality of timing pulleys, timing belts and/or gears so as to transfer rotation from an output of the motor to the lifting shaft. In the particular embodiment of the present invention, the lifting shaft 182 is coupled to the motor via a drive pulley mounted on the lifting shaft 182 common to all four spools 180 carrying the lifting tethers and a timing belt such that rotation of the drive pulley mounted on the lifting shaft by connection to the motor via the timing belt drives rotation of all four spools common to the lifting shaft.

The present invention is not limited to the container lifting mechanism discussed above with reference to the FIG. 6, and other container lifting mechanisms for retrieving a storage container from a grid framework structure of a storage and retrieval system are applicable in the present invention. For example, the container lifting mechanism can be based on the container lifting mechanism taught in PCT/EP2021/051531 in the name of Ocado Innovation Limited, the details of which are incorporated by reference. In PCT/EP2021/051531, the container lifting mechanism comprises a first set of spools and a second set of spools, each spool of the first set of spools and second set of spools carrying a lifting tether having a first end anchored to the grabber device and a second end anchored to the spool, and a rotatable shaft. The first set of spools are mounted to the rotatable shaft such that the rotatable shaft is common to the first set of spools. A drive pulley and a first set of timing pulleys is mounted on the rotatable shaft and is common to the first set of spools such that rotation of the rotatable shaft by the single motor by connection to the drive pulley drives the first set of spools. A second set of timing pulleys is connected to the first set of timing pulleys via one or more of a plurality of timing belts such that rotation of the rotatable shaft by the single motor by connection to the drive pulley drives the second set of spools.

Open Frame Structure

Returning to the modular construction of the load handling device to accommodate the different functional characteristics of the load handling device shown in FIG. 8a, the different modular sections 132a, 134a, 136, 138a of the load handling device can be envisaged by the simplified modular block 132b, 134b, 136b, 138b construction forming a vertically stacked, layered structure shown in FIG. 8b. In the particular embodiment of the present invention, four modular sections 132(*a* and *b*), 134(*a* and *b*), 136(*a* and *b*), 138(*a* and *b*) are shown in a vertical stack, each of the four modular sections providing one or more of the functional characteristics of the load handling device. For the purpose of explanation of the present invention, the four modular sections labelled in increasing height of the load handling device comprises a first, second, third and fourth modular section: the first modular section 132(*a* and *b*) being at the bottom of the load handling device and the fourth modular section 138(*a* and *b*) being at the top of the load handling device. As shown in FIGS. 8(*a* and *b*), each of the four modular sections carries at least a portion of one or more of the functional components of the load handling device. The number and position of the different modular sections within the layered structure is not limited to four modular sections shown in FIGS. 8(*a* and *b*), and includes any number of modular sections providing additional functional characteristics of the load handling device or can be shared amongst any number of modular sections.

Figure 9:
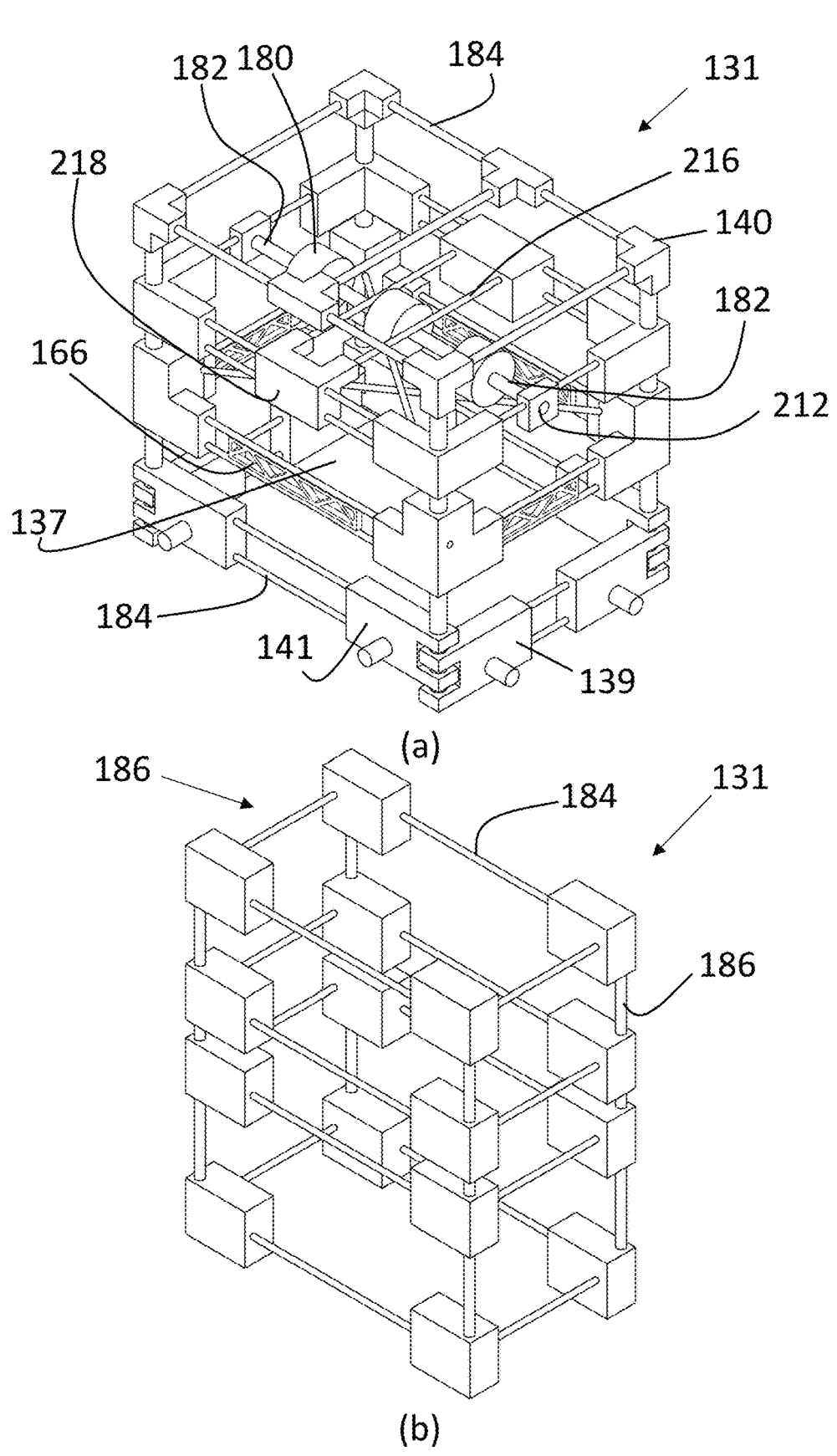
FIGS. 9(a and b) are schematic drawings of (a) an assembly of the modular sections shown in FIG. 8(a) to form an open frame structure of the load handling device; and (b) a simplified version of an assembly of the rectangular frames of the modular sections shown in FIG. 8(b) to form an open frame structure of the load handling device.

Each modular section can be envisaged as a rectangular open frame formed by connecting or linking together corner brackets, where each corner bracket is shown as a connecting block in FIG. 8*b*. A modular section is built by connecting adjacent connecting blocks in the same horizontal plane by one or more connecting elements 184 to form an open rectangular frame 186. Vertically adjacent rectangular frames 186 are thus connected together by connecting vertically adjacent connecting blocks 140 as shown in FIGS. 9(*a* and *b*) to form the open frame structure 131. An example of a connecting block 140 is a corner bracket. In a singular modular section, each corner bracket is connected to two other corner brackets in the same horizontal plane by one or more connecting elements 184. The connecting elements can be connecting rods or tubes for linking adjacent connecting blocks (corner brackets) together in a single modular section. The connecting rods can be solid or hollow and is dependent on the connection with the connecting block as will be further explained below. In the particular embodiment of the present invention, the open frame structure is a three dimensional structural defining a volume having an upper portion for housing the power source 180, the control unit 192, the spools 182 carrying the lifting tethers, and a lower portion housing the container receiving space 137.

The structural integrity of the open frame structure should be sufficient to not only support the different functional characteristics of the load handling device but also have sufficient flexural rigidity when the load handling device is operational on the grid structure. Various materials can be used in the fabrication of the connecting rods or tubes. These include but are not limited to metal or polymers or ceramic or a combination thereof. To reduce the weight of the load handling device and have the necessary structural properties to support the different functional components of the load handling device, optionally the connecting rods linking adjacent corner brackets together are composed of carbon fibre bound in a polymer matrix (known as carbon fibre rods). To aid with the construction of the rectangular frames forming the modular sections, each of the connecting blocks of one or more of the modular sections comprises an opening or socket 187 (see FIGS. 10 and 11) for insertion of the connecting rods. The connecting rod is fixed to the connecting block by a joint. Various joints can be used to fix the connecting rods to the corner brackets in a modular section. These include various fasteners, glues, welding etc. Further detail of the joint fixing the connecting blocks to the connecting rods is discussed below.

A simplified modular section is where the connecting block 140 is a corner bracket such that a modular section comprises four corner brackets. Each of the four corner brackets is directly connected to two other corner brackets in the same horizontal plane to form a simple open rectangular frame as shown in FIG. 8*b*. However, the corner brackets in a single modular section can be indirectly connected to two other corner brackets by one or more connecting blocks intermediate of the corner brackets at the corners of the rectangular frame as clearly shown in FIG. 8*a*. Thus, the term "connected" with reference to the corner brackets in each of the modular sections can be broadly construed to mean directly and/or indirectly connected to two other corner brackets.

Figure 10:
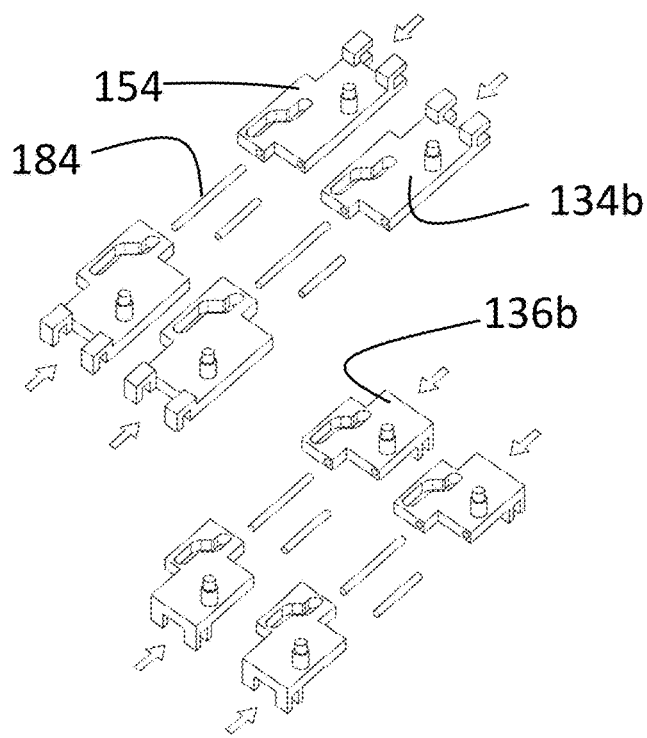
FIG. 10 is a schematic drawing showing the assembly of the connecting blocks comprising the wheels mounts of the wheel assembly.
Figure 11:
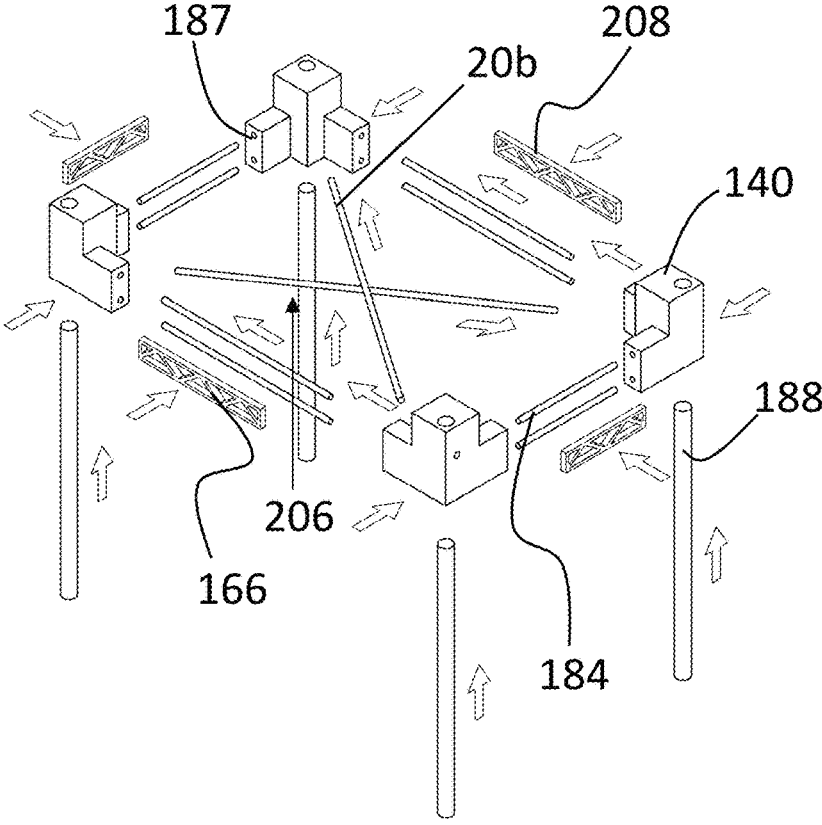
FIG. 11 is a schematic drawing showing the assembly of the connecting blocks to form a rectangular frame, the rectangular frame being braced to represent the middle halo of the open frame structure.
Figure 12:
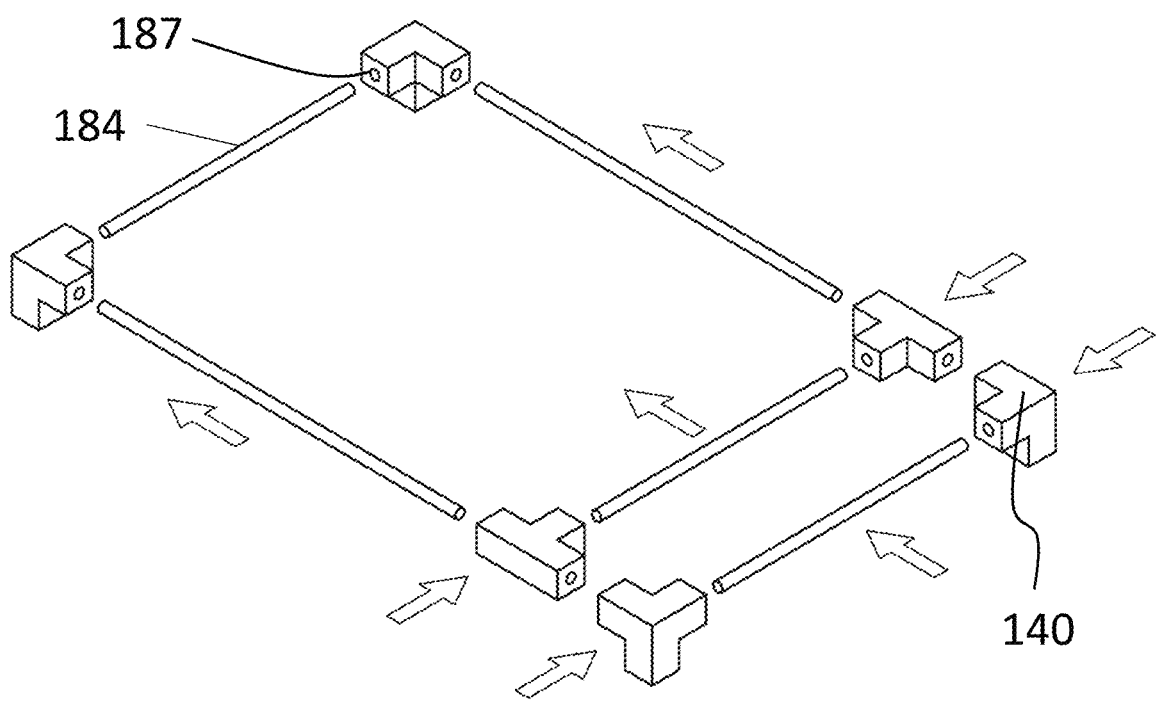
FIG. 12 is a schematic drawing showing the assembly of the connecting blocks to form the top rectangular frame of the fourth modular section of the open frame structure shown in FIG. 8(*a*).

To construct the load handling device according to the present invention, the different modular sections can be linked together by simply linking vertically adjacent rectangular frames 186 together by one or more vertical connecting elements 188 via their respective corner brackets 140 to form an open frame structure 131 as shown in the simplified open frame structure in FIGS. 8*a* and 8*b*. In other words, the same corner brackets for connecting to two other corner brackets in a single modular section can be used to vertically connect adjacent rectangular frames together. The corner brackets of vertically adjacent rectangular frames can be mounted to the same vertical connecting element 188 at each corner of the open frame structure such that the vertical connecting element extends though the corner brackets of multiple vertically adjacent rectangular frames. As a result, each of the corners of the open frame structure share the same or common vertical connecting element. To link multiple rectangular frames to the same vertical connecting element at each corner of the open frame structure via their respective corner brackets, the corner brackets intermediate or between the bottom and top rectangular frames have one or more through holes for the vertical connecting elements the extend through the corner brackets when linking together vertically adjacent rectangular frames 186 (see $2^{nd}$ modular section in FIG. 8*a*). This has the advantage that multiple rectangular frames 186 can be vertically linked together in a stack simply by mounting the multiple rectangular frames to the same vertical connecting element at each corner of the open frame structure to form the load handling device as shown in FIGS. 8(*a* and *b*). Alternatively, separate vertical connecting elements can be used to connect vertically adjacent rectangular frames at each corner of the open frame structure. The length of the vertical connecting elements connecting vertically adjacent rectangular frames dictates the height of the load handling device. The connecting elements 188 linking vertically adjacent rectangular frames together can be same type or different type of connecting elements to the connecting elements linking adjacent corner brackets in the same horizontal plane. For example, the connecting elements 188 linking vertically adjacent rectangular frames together can be a connecting rod that is used to link the corner brackets in a single modular section. The linking together of the corner brackets forming the connecting blocks by horizontal 184 and vertical 188 connecting rods is shown in FIGS. 10 to 12. FIGS. 10 to 12 show the assembly of the different modular sections of the load handling device, where FIG. 10 represents the assembly of the $1^{st}$ modular assembly comprising the wheel mounts 139, 141, FIG. 11 represents the assembly of the $2^{nd}$ modular section comprising the support or rail 166 for the traveller of the cam mechanism of the wheel positioning mechanism discussed above, and FIG. 12 is the fourth modular section for supporting the electrical components and power source of the load handling device. The block construction of the modular sections is clearly shown in FIGS. 10 to 12, where each corner bracket or connecting block 140 comprises one or more sockets 187 that are shaped to receive one or more connecting rods or tubes 184, 188 for linking the connecting blocks together to form a single modular section and vertically adjacent modular sections are linked together in a vertical stack. The arrows in FIGS. 10 to 12 show the direction of the connecting rods or tubes 184 when being inserted into their respective sockets 187 in the connecting blocks or corner brackets 140.

To simplify the construction of the load handling device whilst still accommodating the different functional characteristics of the load handling device, at least a portion of the functional components of the load handling device is integrated into the open frame structure 131 of the load handling device 130, in the sense that at least a portion of the functional components of the load handling device are integral with one or more of the rectangular frames of the load handling device. For example, at least a portion of the wheel assembly is integral with one or more rectangular frames, at least a portion of the wheel drive assembly is integral with one or more rectangular frames, at least a portion of the wheel positioning mechanism is integral with the one or more rectangular frames and/or at least a portion of the container lifting mechanism is integral with one or more rectangular frames.

To integrate at least a portion of the different functional characteristics of the load handling device into one or more of the rectangular frames making up the open frame structure of the load handling device, one or more of the connecting blocks 140 of one or more of the rectangular frames 186 is fabricated with the functional characteristics of the load handling device in mind. At least a portion of one or more of the functional components of the load handling device is integrated into one or more connecting blocks of one or more rectangular frames. For example, one or more of the corner brackets linking the rectangular frames together may be integrally formed with one or more mounts for a spool, pulley and/or motor rather than having separate mounts for mounting to the frame of the load handling device.

The simplest of the modular sections in the particular embodiment of the present invention is the fourth or top modular section. The rectangular frame 186 of the fourth or top modular section as shown in FIG. 6 provides the support for the electrical components of the load handling device such as the power source 190 and/or control unit 192 for controlling the operation of the wheel drive assembly and/or the wheel positioning mechanism and/or the container lifting mechanism. In the particular embodiment of the present invention, one or more electrical components of the load handling device is supported in one or more cradles 194 which in turn is supported by the rectangular frame. A cross beam or rod 185 extends across the rectangular frame 186 of the fourth or top modular section to support one or more electrical components of the load handling device as shown in FIG. 8*a*. As a result, each of the corner brackets 140 of the rectangular frame of the top modular frame is indirectly connected to two other corner brackets in the same horizontal plane via a connecting block intermediate of the corner brackets. Opposing connecting blocks intermediate of the corner brackets are linked together to form the cross beam or rod extending across the rectangular frame as shown in FIG. 8*a*. The rectangular frame of the top modular section is formed by linking together the connecting blocks including the corner brackets by one or more connecting elements as shown in FIG. 12.

Figure 13:
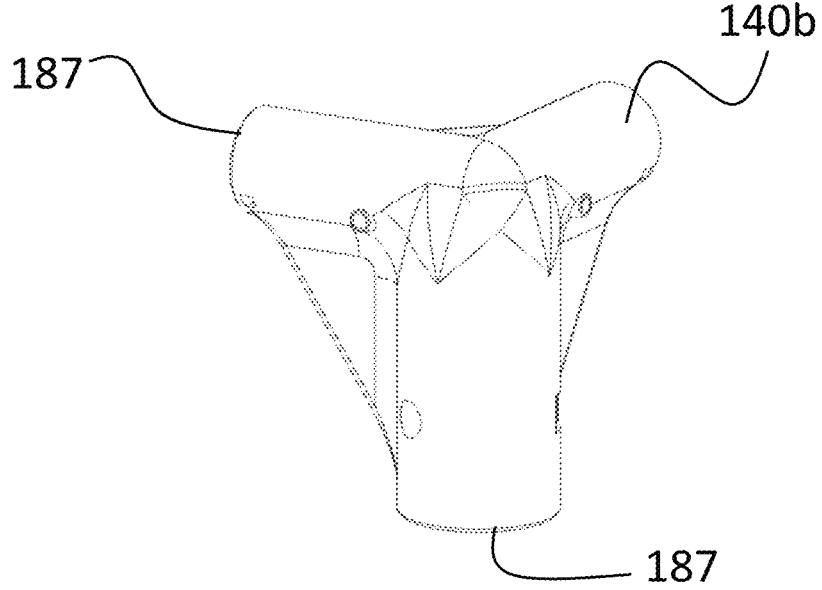
FIG. 13 is a schematic drawing of a connecting block forming a corner bracket of the top or fourth modular section.
Figure 14:
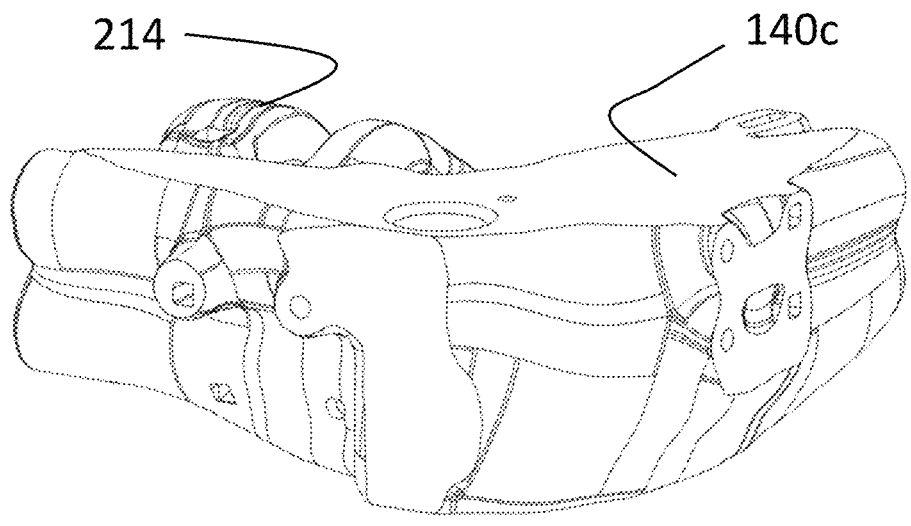
FIG. 14 is a schematic drawing of a connecting block forming a corner bracket of the third modular section.

Different connecting blocks can be used to construct the different modular sections and the choice of connecting block is largely dependent on the different functional characteristics of the load handling device. The simplest of the corner brackets or connecting blocks 140*b* is shown in FIG. 13. This is because the rectangular framework of the top modular section provides minimum function to the load handling device besides supporting the power source and the control unit. Here, each of the corner brackets or connecting blocks of the top modular section comprises three openings or sockets 187 (see FIG. 13); two for connecting to two other connecting blocks in the same horizontal plane via separate connecting elements and a downwardly extending socket for linking the top modular section to a vertically adjacent rectangular frame in a vertical stack. Since at least a portion of the functional components of the load handling device is integrated within the open frame structure, more specifically the connecting blocks of the open frame structure, the shape of the connecting blocks becomes more complex as the complexity of the functional characteristics of the load handling device increases, i.e. lower down the load handling device which comprises the container lifting mechanism, wheel drive assembly and the wheel assembly. Examples of the various complex connecting blocks 140(*b* to *e*) forming the corner brackets of the open frame structure is shown in FIGS. 13 to 16 and represent the different corner brackets for assembling the rectangular frames of the different modular sections of the load handling device.

Various lightweight materials can be used in the fabrication of the connecting blocks. Examples of lightweight materials include but are not limited to various lightweight metals, e.g. aluminium or various polymeric materials, e.g. plastic materials, or composite materials (e.g. carbon fibre/polymer composite). Various methods can be used to fabricate the connecting blocks. These include but are not limited to machining from a block, injection moulding or casting. However, as the complexity of the connector blocks increases, particularly when at least a portion of the functional component of the load handling device is made integral with the connecting blocks 140, 140(*b* to *e*), more sophisticated fabrication methods can be used. The use of additive manufacturing such as 3D printing provides the ability to fabricate complex connecting blocks such that at least a portion of the functional component of the load handling device can be integrally formed with one or more connecting blocks. The use of additive manufacturing in the fabrication of the connecting blocks, particularly, the corner brackets allows one or more of the connecting blocks to be topology optimised to take into account the stresses that the connecting blocks would experience in the open frame structure. This is because additive manufacturing or 3D printing has the ability to form complex shapes that cannot be achieved by machining alone. This is particularly the case where the connecting blocks are topology optimised since the outcome of topology optimization tends to result in complex shapes in order to take into account various load constraints that the connecting block would encounter in application in the open frame structure of a load handling device.

The wheels of the wheel assembly are supported by the rectangular frame 186 at the bottom or first modular section. To accommodate the wheels of the wheel assembly, each of the connecting blocks, more specifically corner brackets, of the bottom or first modular section is integrally formed with one or more wheel mounts 139, 141 of the first and second sets of wheels. In the particular embodiment of the present invention shown in FIG. 16, each of the corner brackets 140e of the bottom modular section is formed in two parts for accommodating two wheel mounts, namely a first and second wheel mount 139, 141. The first wheel mount 139 is configured for mounting a wheel of the first set of wheels 134 and the second wheel mount 141 is configured for mounting a wheel of the second set of wheels 136 (such that there is a total of eight wheels mounted to four corner brackets 140e; two wheel mounts for each of the four corner brackets 140e and arranged to support the open frame structure of the load handling device). In other words, each of the four corner brackets 140e of the first or bottom modular section is integrally formed with two wheel mounts; the first and second wheel mounts 139, 141. To accommodate two wheel mounts in one corner bracket 140e, the two wheel mounts of a given corner bracket are assembled substantially perpendicularly to each other so that the first wheel mount 139 provides a mount for a wheel for moving the load handling direction in the first direction and the second wheel mount 141 provides a mount for moving the load handling device in a substantially perpendicular direction. In the particular embodiment of the present invention shown in FIGS. 10 and 16, the first and second wheel mounts 139, 141 of the corner brackets comprise a shaft or spigot for rotatably mounting a respective wheel.

Figure 16:
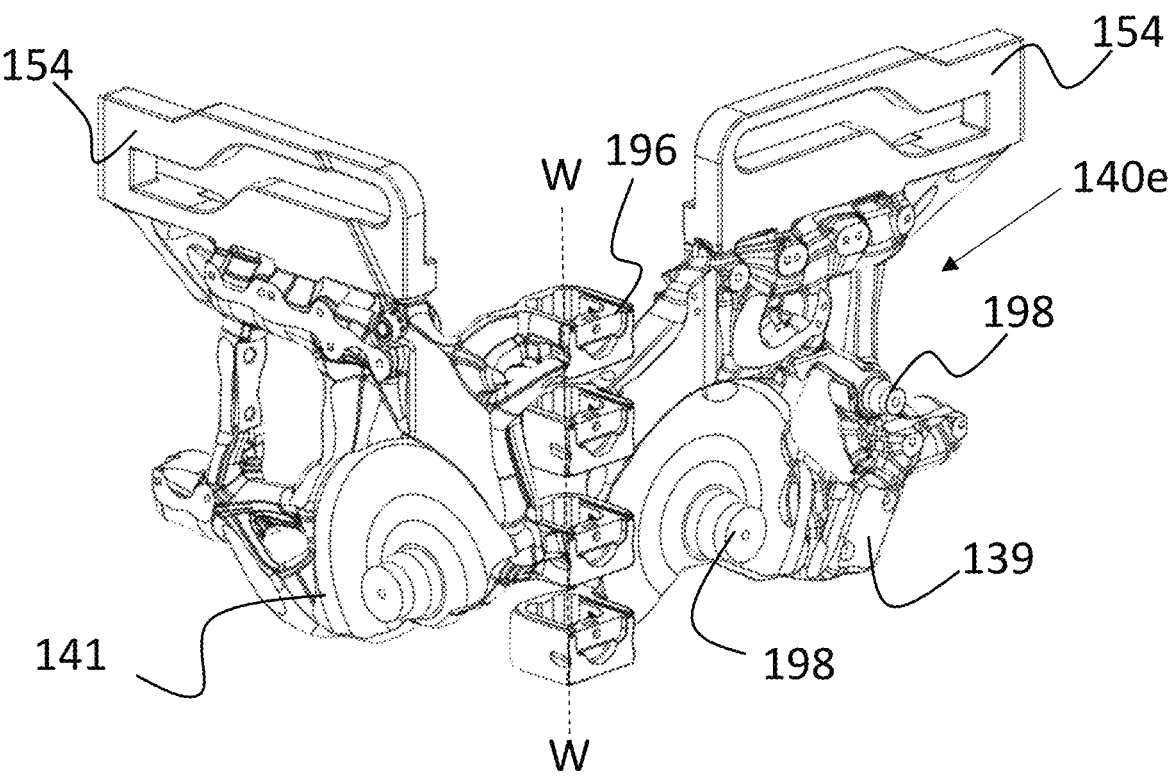
FIG. 16 is a schematic drawing of a connecting block forming a corner bracket of the first or bottom modular section comprising the wheel mounts.

Also shown in FIG. 10 and clearly in FIG. 16, an edge or end of each of the first and second wheel mount of a given corner bracket 140e comprises one or more bosses or fingers 196 with openings that are vertically aligned or concentric to receive a connecting element 188 through the openings of the one or more bosses. The one or more bosses 196 at the edge of the first and second wheel mounts 139, 141 are spaced apart so that the bosses 196 of both of the first and second wheel mounts of a given corner bracket interdigitate and that the openings in their respective bosses axially align along a wheel positioning axis, W-W (see FIG. 16) for receiving a connecting element 188 when the bottom or first modular is vertically linked to the second modular section directly above as shown in FIG. 8a. The wheel positioning axis W-W is the axis along which the respective first or second set of wheels are raised or lowered depending on the direction of movement on the grid structure. In FIG. 16, the wheel positioning axis W-W is shown as a vertical axis along which the first and second sets of wheels are raised and lowered. For a given corner bracket, the bosses 196 at the edge of the first and second wheel mounts 139, 141 of the corner bracket 140e are sufficiently spaced apart so that when the spaced apart bosses interdigitate, each of the first 139 or second 141 wheel mounts of the corner bracket 140e can move independently of the other second 141 or first 139 wheel mounts along its vertical connecting element, i.e. along the wheel positioning axis W-W. This is to allow a pair of wheels of the first set of wheels to be raised or lowered independently of the pair of wheels of the second set of wheels when mounted to the corner brackets. This is repeated for the other corner brackets of the bottom modular section such that all four corner brackets of the bottom modular section provide wheel mounts for supporting all of the wheels of the first and second sets of wheels, i.e. eight wheels. Each of the wheel mounts of the corner bracket comprises an integrally formed wheel shaft 198 for rotatably mounting a wheel onto the shaft. Each corner bracket 140e for mounting the wheels of the wheel assembly is connected to two other corner brackets to form a rectangular frame by one or more connecting elements 184. In the particular example of the present invention shown in FIGS. 8a and 9a, each of the corner brackets 140e is connected to two other corner brackets in the same horizontal plane by two connecting rods 184 receivable in openings or sockets 187 in the corners brackets (see FIG. 10). However, the number of connecting elements 184 for connecting adjacent corner brackets in the same horizontal plane to form a rectangular frame of the 1ˢᵗ modular section comprising the wheel assembly is not limited to two connecting elements and can be any number of connecting elements to provide the necessary structural rigidity of the rectangular frame.

To drive rotation of the first and second sets of wheels, at least a portion of the wheel drive assembly discussed above can be integrated into one or more of the rectangular frames of the open frame structure of the load handling device. In the case where the wheel drive assembly comprises a drive belt assembly 140 at each side face of the load handling device discussed above, the mounts for the drive and the slave wheels for carrying the drive belt can be integrally formed with one or more of the connecting blocks 140e (see FIG. 16) of one or more of the rectangular frames. For example, in the particular embodiment of the present invention shown in FIG. 16, each of the corner brackets 140e comprising the wheel mounts 139, 141 for the wheel assembly additionally comprises a mount 198 for the slave wheels 148 of the drive belt assembly such that the drive belt travels around the outer periphery of the wheels 134, 136 mounted to the corner bracket 140d and around the slave wheel 148 on the same corner bracket 140e (see FIGS. 6 and 16). As each corner bracket 140d is integrally formed with two wheel mounts 139, 141 for the wheels orientated perpendicular to each other to cover the travelling directions of the load handling device on the grid structure, the mounts 198 for their respective slave wheels can be integrally formed with each of the wheel mounts 139, 141 of the corner bracket 140e. The drive pulleys for driving the rotation of a pair of wheels of the first or second set of wheels are mounted to the corner brackets 140d of the rectangular frames located higher in the vertical stack such that drive belt extends around a pair of wheels at one side face of the load handling device and around the drive wheels mounted to the higher modular sections. In the particular embodiment of the present invention, the drive wheels for driving the drive belt of each wheel drive assembly are mounted to a shaft or spigot 202, 204 integrally formed with the corner brackets 140 forming the rectangular frame of the second modular section. As a result, a pair of wheels of each of the first and second sets of wheels are driven by a drive belt that connects the slave wheels in the first modular section and the drive wheels mounted to the corner brackets of the second modular section. This is repeated for the other drive assemblies at each side face of the load handling device as shown in FIG. 6. Also shown in FIG. 6 is that each wheel drive assembly for driving a pair of wheels additionally comprises the tensioning wheel arrangement discussed above to ensure that the drive belt around a given pair of wheels remain taut. In the particular example of the load handling device shown in FIG. 6, one or more of the corner brackets of the rectangular frame supporting the wheels also comprises the wheel tensioning arrangement.

The drive assembly is not limited to the drive belt assembly discussed above and the connecting blocks of the rectangular frame carrying the wheels of the wheel assembly can integrated with a mount for carrying a hub motor discussed above. Thus, each corner bracket of the rectangular frame of the first or bottom modular section can be integrally formed with a mount for a drive assembly comprising a hub motor: wherein the inner hub of the hub motor is mounted to the corner bracket. Since each of the corner brackets of the first or bottom modular section is formed with two wheel mounts for mounting two wheels, each corner bracket is integrally formed with two mounts for mounting two hub motors: one to mount a wheel in the first direction and the other to mount a wheel in the second direction.

To change direction on the grid structure, the load handling device comprises a wheel positioning mechanism. Various wheel positioning mechanisms are known in the art, some of which are discussed above. Considering that sufficient force is required to vertically lift a pair of wheels of a given set of wheels relative to the open frame structure, at least a portion of the wheel positioning mechanism is mounted to a rectangular frame of the open frame structure that has been reinforced to bear the weight of the pair of wheels at each side face of the load handling device. In the particular example of the load handling device shown in FIGS. 6 and 11, the rectangular frame of the second modular section is reinforced by one or more struts or braces 206 and is termed as "a middle halo" since it is located substantially middle of the height of the load handling device. Reinforcement of the middle halo is provided by one or more cross braces 206 extending across the rectangular frame. The particular example of the wheel positioning mechanism shown in FIG. 6 is based on the cam mechanism discussed above comprising a cam, cam follower moveable along the cam and a traveller for moving the cam follower. The traveller is configured to move along a rail 166 on one side face of the load handling device to raise a pair of wheels. The rail 166 for supporting the traveller for raising a pair of wheels comprises the horizontal connecting elements extending between the corner brackets of the rectangular frame of the middle halo such that the traveller moves along the connecting elements 184 connecting the corner brackets 140 on one side face of the load handling device. The connecting elements for supporting the traveller of the middle halo thus functions as an overhead rail. In the particular example of the present invention shown in FIG. 6, the traveller is slideably mounted to the connecting elements connecting corner brackets in the same horizontal plane. This is repeated for the other pairs of wheels at each of the side faces of the load handling device. To support the traveller, at least two connecting elements 184 extend between the corner brackets 140 on one side face of the load handling device. One or more inserts 208 are sandwiched between the two connecting elements 184 extending between the corner brackets 140 to provide flexural rigidity of the connecting elements extending between the corner brackets 140 to prevent excessive bending of the connecting elements when the traveller moves along the connecting elements. In the particular example of the present invention, the cam mechanism for each of the pairs of wheels of the first and second sets of wheels is based on a double cam arrangement as discussed above: wherein the traveller is configured to raise and lower a given pair of wheels via the double cam arrangement. The cam for cooperating with the cam follower can be mounted to the corner brackets supporting the wheels of the wheel assembly or be integrally formed with the corner bracket. With the double cam arrangement on each side face of the load handling device, two cams are mounted to each corner bracket that cooperate with two respective cam followers to cater for the vertical movement of the wheels orientated in the first and second direction (see FIG. 15). Thus, for a given corner bracket, a first cam is mounted to or integrally formed with the first wheel mount of the corner bracket and a second cam is mounted to or be integrally formed with the second wheel mount of the corner bracket such that when both the first and second wheel mount of the corner brackets are brought together, the cams on the different side faces of the load handling device cooperate with their respective cam followers. Similar corner brackets are used for mounting the other wheels of the wheel assembly.

As the cam follower travels along the cam, an upward or downward force is applied to a respective corner bracket carrying a wheel of the first or second sets of wheels which causes the wheel to raise or lower depending on the direction of travel of the load handling device on the grid structure. As discussed above, each corner bracket for mounting the wheels of the wheel assembly is formed from two interdigitated parts, namely a first part 139 and a second part 141, each of the first and second part comprising a wheel mount for a wheel. The first part providing a wheel mount for a wheel of the first set of wheels and the second part providing a wheel mount for a wheel of the second set of wheels, and is respectively defined as a first wheel mount 139 and a second wheel mount 141. The bosses or fingers 196 at the edge of the first and second wheel mounts are sufficiently spaced apart such that when the bosses interdigitate, the first wheel mount can move independently of the second wheel mount axially along its connecting vertical connecting element. Where the vertical connecting elements are connecting rods, the diameter of the openings in the one or more bosses of each of the first and second wheel mounts of the corner brackets are slightly larger than the diameter of the connecting rods 188 so as to allow the first and second wheel mounts 139, 141 of the corner brackets to be moveable vertically when a force is applied in a vertical direction. The cam 154 for cooperating with the cam follower 158 can be integrally formed with its respective corner bracket 140e comprising the wheel mounts of the wheel assembly as shown in FIG. 16. Two cam 154 are shown integrally formed with the corner bracket 140e, one for each of the wheel mounts 139, 141. As can be appreciated from the description above in connection with FIGS. 6 and 16, at least a portion of the wheel positioning mechanism is integrally formed with the connecting blocks, more particularly, the corner brackets, of one or more rectangular frames forming the different modular sections of the load handling device.

Figure 15:
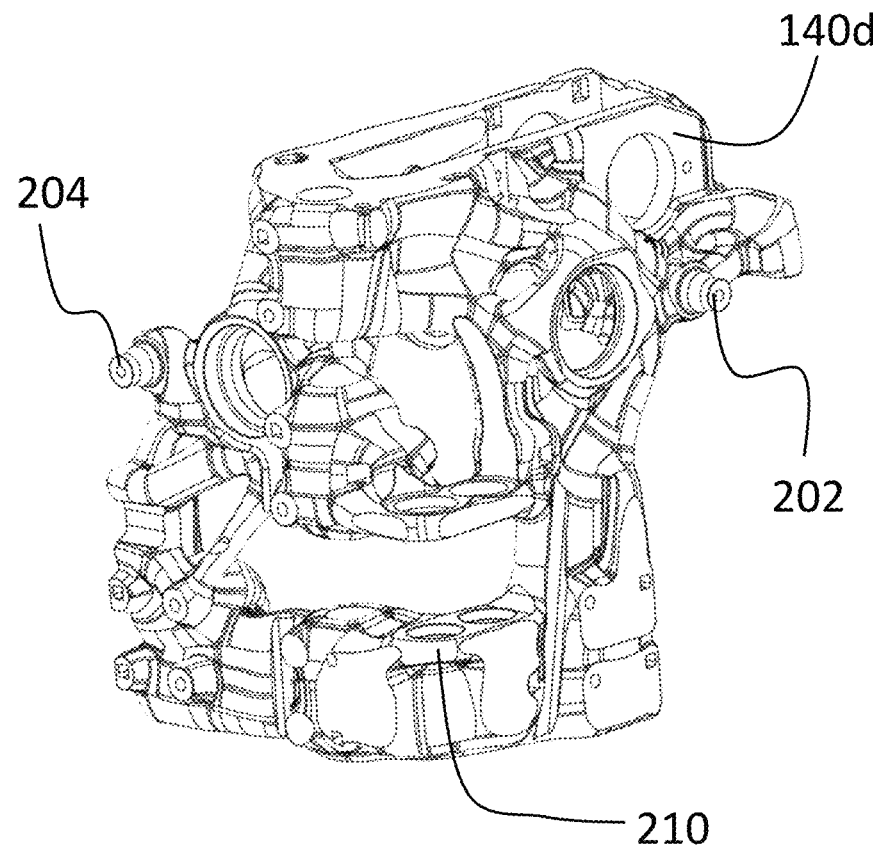
FIG. 15 is a schematic drawing of a connecting block forming a corner bracket of the second modular section.

Also shown in FIG. 6, is that the motor for moving the traveller along the connecting elements is mounted to the corner brackets 140d of the rectangular frame forming the middle halo of the open frame structure. One or more mounts for one or more motors are integrally formed with the connecting blocks, more specifically the corner brackets of the rectangular frame of the middle halo. As shown in FIG. 15, one or more openings 210 are integrally formed in the corner bracket 140d for receiving a motor shaft of the motor. The corner bracket 140d also supports a spool for taking up the belt connected to the traveller as the spool rotates such that when the motor rotates in a clockwise direction, the belt is wound on the spool and when the motor rotates in an anti-clockwise direction, the belt is unwound from the spool.

In addition to at least a portion of the wheel positioning mechanism being integrally formed with the connecting blocks or corner brackets forming the rectangular frames of one or more modular sections, at least a portion of the container lifting mechanism, more specifically the winch assembly, is integrally formed into the rectangular frame of one or more modular sections. The lifting shaft for driving rotation of the four spools carrying the lifting tethers connected to the grabber device is rotatably mounted to a rectangular frame of a modular section. In the example shown in FIG. 8a, the lifting shaft 182 is rotatably mounted to the rectangular frame of the third modular section. The lifting shaft 182 is shown in FIGS. 8a and 9a extending across the rectangular frame. Opposing ends of the lifting shaft are rotatably mounted to the connecting elements connecting adjacent corner brackets via a respective connecting block 212. The four lifting pulleys 214 of the container lifting mechanism, one at each corner of the lifting assembly for guiding the lifting tethers to respective corners of the grabber device, are each mounted to a respective corner bracket 140c of the rectangular frame (see FIG. 14). Thus, each tether extending from a respective spool around a respective pulley extends downwards and connects to the grabber device, e.g. a corner of the grabber device. The mounts for the four pulleys 214 can be integrated into the respective corner brackets 140c of the rectangular frame.

In the particular embodiment of the present invention, the container receiving space 137 (see FIG. 9a) for accommodating a storage container when lifted by the grabber device is housed within the open frame structure of the load handling device: more specifically in the region of the $1^{st}$, $2^{nd}$ and the $3^{rd}$ modular sections (the $3^{rd}$ modular section supporting the spools carrying the lifting tethers). However, as vertically adjacent modular sections are connected together by their respective connecting blocks via vertical connecting rods, it is necessary that the grabber device is guided when it is lifted and lowered in and out of the container receiving space so as to prevent the grabber device fouling the connecting blocks. In the particular embodiment of the present invention, downwardly extending guides (not shown) are mounted to the connecting blocks 140c of the $2^{nd}$ modular section of the load handling device, one at each corner of the rectangular frame, so as to guide the grabber device as it is lowered or raised into the container receiving space. Each of the guides is shaped to comprise two perpendicular guiding plates for accommodating a corner of the grabber device shown in FIG. 7.

As the container lifting mechanism is configured to lift and lower a storage container which can weigh up to 40 kg, the connecting elements extending between the corner brackets can be braced by one or more bracing elements 216 to strengthen the rectangular frame of the modular section supporting the spools carrying the lifting tethers. In the particular example shown in FIG. 8a and FIG. 9a, two bracing elements 216 are shown bracing the connecting elements extending between the corner brackets at the opposing side faces of the load handling device. The opposing ends of the bracing elements are mounted to the connecting elements by a connecting block 218.

A plurality of the rectangular frames 186 are assembled together in a vertical stack to provide the different functional characteristics of the load handling device discussed above. Vertically adjacent rectangular frames are connected together by vertical connecting elements 188 to form the open frame structure 131 supporting the different functional characteristics of the load handling device. FIGS. 10 to 12 shows examples of assembling the connecting blocks together by the connecting rods to form the rectangular frames of the first, second and fourth modular section respectively. Preferably, each of the connecting blocks 140 at the corners of the plurality of rectangular frames (corner brackets) are linked or connected together in a vertical stack by one or more vertical connecting elements or rods 188. The vertical connecting rods for connecting vertical adjacent rectangular frames is shown in FIG. 11. The vertical connecting rods are shown being secured to the connecting blocks at the corners of the rectangular frame (corner bracket). To link the connecting blocks together with the connecting rods, the connecting blocks comprise one or more openings or sockets 187 for receiving the ends of the connecting rods. Manufacture of the load handling device involves inserting the ends of the connecting rods into the openings or sockets of the connecting blocks so as to link the connecting blocks together. To help with reducing the weight of the load handling device according to the present invention, the connecting rods are typically hollow, e.g. hollow pipes. A jig can be used to assemble the individual rectangular frames together whilst the connection between the connecting blocks and/or corner brackets and the connecting elements are secured by a suitable joint.

During operation of the load handling device on the grid structure, stresses encountered by the open frame structure are concentrated around the joint between the connecting blocks and the connecting rods. If the connecting rods are not properly secured to the connecting blocks, there is the risk that one or more of the connecting rods would detach from its corresponding connecting block leading to the eventual break-up of the rectangular frame to which the connecting block is associated with and in a worst case scenario, the breakup of the open frame structure. To ensure the structural integrity of the resultant open frame structure, the joint for securing the ends of the connecting rods to the connecting blocks should be sufficiently strong to prevent the ends of the connecting rods from detaching from the connecting blocks, more specifically the sockets 187 in the connecting blocks. Various joints can be used to secure the ends to the connecting rods to the connecting blocks and largely depends on the material used in the fabrication of the connecting blocks and connecting rods. The various joints can include but are not limited to gluing or welding.

Joint

Whilst one or more of the connecting blocks of the open frame structure can be topology optimised to cater for the different loads or stresses encountered by the open frame structure when operating as a load handling device on the grid structure, the joint between the connecting blocks 140 and the connecting elements 184, 188, e.g. connecting rods, also needs to be sufficiently strong to withstand the forces encountered when the load handling device is operating on the grid structure. Such forces include forces trying to pull the connecting rods out of the sockets 187 of the connecting blocks as well as bending forces and torsional forces as the connecting elements are subject to bending moments. Various techniques can be used to secure the connecting blocks to the connecting elements. These include the use of an adhesive or glue, fasteners or welding or a combination of any one of the securing methods. The use of an adhesive to secure the connecting block to the connecting element appears to be the most efficient and cost effect way to assemble the open framework structure comprising connecting blocks linked together by a plurality of connecting elements. However, as a load handling device operable on the grid framework structure is subject to many forces such as bending and torsional forces leading to bending moments at the joint between the connecting blocks and the connecting elements, the joint between the connecting block and the connecting element needs to be sufficiently strong to prevent the connecting elements which are usually in the form of a rod from detaching from the connecting block. Whilst various commercially available adhesives have the required bonding strength to secure the connecting element to the connecting block, the ability of the adhesive to provide a secure connection between the connection block and the connecting element is largely dependent on the surface contact area of the adhesive between the connecting block 140 and the connecting element 184, 188. The larger the contact surface area of the adhesive between the connecting block and the connecting element, the greater the bond strength as more of the adhesive is able to contribute to the bond strength between the connecting block and the connecting element.

In the case where the connecting element is a rod and the rod is inserted into an opening or socket 187 integrally formed within the connecting block 140, the bond strength between the rod and the socket having an internal wall largely depends on the spread of adhesive along the connecting end of the rod. Simply coating one end of the rod with the adhesive and inserting the rod into the socket 187 of the connecting block 140 suffers from the problem that excess adhesive may be pushed out of the entrance the socket since the socket is a blind hole leaving an accumulation of adhesive at the entrance of the socket. This is both unsightly and may introduce other deformities in the assembly comprising the connecting block, e.g. in the open frame structure discussed above. Secondly, coating the connecting end of the connecting element does not lend itself kindly to assembling a plurality of connecting blocks with the connecting elements prior to securing or bonding the connecting blocks to the connecting elements with an adhesive. This is particularly the case where the plurality of connecting blocks and connecting elements are assembled in a jig to ensure that the connecting blocks are correctly aligned with the rods in the assembly. The problem is exacerbated when the adhesive used to secure the connecting block to the connecting element has a relatively short curing time after being applied. The problem is not just limited to the connecting blocks in the fabrication of the open frame structure for supporting the components providing the functional characteristics of a load handling device discussed above, and the problem may exist when connecting any type of connecting block with a connecting element such as a rod.

A joint is thus required that is able to secure a connecting block with a rod that does not suffer from the deficiencies discussed above. In the present invention, the adhesive, which is in the form of a fluid, is ideally spread along the connecting end of the rod after or subsequent to the connecting end of the rod being inserted into the socket of the connecting block. This allows a plurality of connecting blocks to be assembled together with their respective rods prior to bonding or securing the rods to their respective connecting blocks, and thus allows the use of a jig to control the precision or accuracy of the alignment of the connecting blocks with its respective rods. In an example of the present invention, the internal wall of the socket comprises a groove that extends around at least a portion of the internal wall of the socket for distributing adhesive along the connecting end of the rod. The connecting block comprises an inlet having an inlet opening external of the connecting block and in fluid communication with the groove for injecting adhesive into the groove, the groove being configured to form a glue channel when the connecting end of the rod is inserted into the socket such that when adhesive is injected into the inlet opening, the adhesive flows along the glue channel around the outer surface of the connecting end of the rod. Different shapes of grooves can be formed within the internal wall of the socket. An efficient method of distributing adhesive along the connecting end of the rod is to provide a continuous groove extending axially along at least a portion of the length of the socket to provide a continuous glue channel when the connecting end of a rod is inserted into the socket and which is in fluid communication with the inlet opening.

Figure 17:
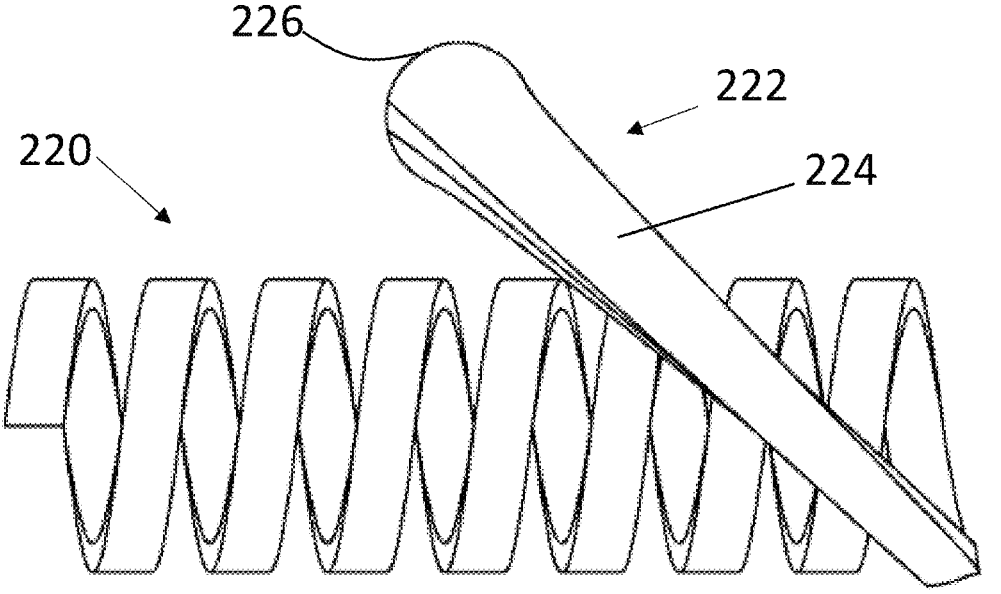
FIG. 17 is a schematic drawing of a glue channel within the connecting blocks for fixing to a connecting elements according to a first example of the present invention.

One example of providing a continuous groove is a helical or spiral groove formed within the internal wall of the socket which results in a glue channel 220 having a helical or spiral shape. An example of a helical or spiral glue channel 220 that extends axially along at least a portion of the longitudinal length of the socket is shown in FIG. 17. The spiral or helical glue channel 220) allows the adhesive to be distributed or spread axially along the connecting end of the rod. Also shown in FIG. 17 is an inlet 222 for supplying adhesive to the spiral glue channel 220. The inlet comprises an inlet path 224 in fluid communication with the spiral glue channel 220 and extends from an opening 226 of the inlet 222 to the spiral glue channel 220. The opening 226 is formed in at least one external wall of the connecting block such that adhesive can be supplied to the glue channel externally of the connecting block. This has the advantage that adhesive can be supplied to the glue channel subsequent to the rod being inserted into the socket of the connecting block and this allows, a plurality of connecting blocks to assembled together in a jig prior to bonding the plurality of connecting blocks to its respective connecting elements.

Different adhesives have different viscosities and curing times. To cater for the different adhesives having different viscosities and curing times being injected into the glue channel, the rate of flow of the adhesive is controlled through the glue channel. A too low flow rate may result in the adhesive curing prematurely before it has filled the glue channel and a too high flow rate may result in the adhesive escaping the glue channel before it has cured. To control the rate of flow of adhesive through the glue channel, the inlet pathway 224 extending from the inlet opening 226 to the glue channel 220 has diverging walls or is tapered to create a Venturi effect such that there is a pressure difference between the pressure at the inlet opening 226 and the pressure at the entrance of the glue channel 220. By controlling the divergence of the inlet path 224, this pressure difference can be controlled, and thus the rate of flow of adhesive through the glue channel. In the particular example shown in FIG. 17, the inlet pathway 224 diverges such that the inlet pathway constricts as it approaches the entrance of the glue channel 220 resulting in a greater flow rate at the entrance of the glue channel. Whilst not shown in FIG. 17, the connecting block can optionally comprise an outlet comprising an outlet pathway extending from an outlet opening external of the connecting block such that excess adhesive can exit the glue channel through the outlet opening. Adhesive exiting the outlet opening provides an indication that the adhesive has sufficiently filled the glue channel and the adhesive process is complete.

Figure 18:
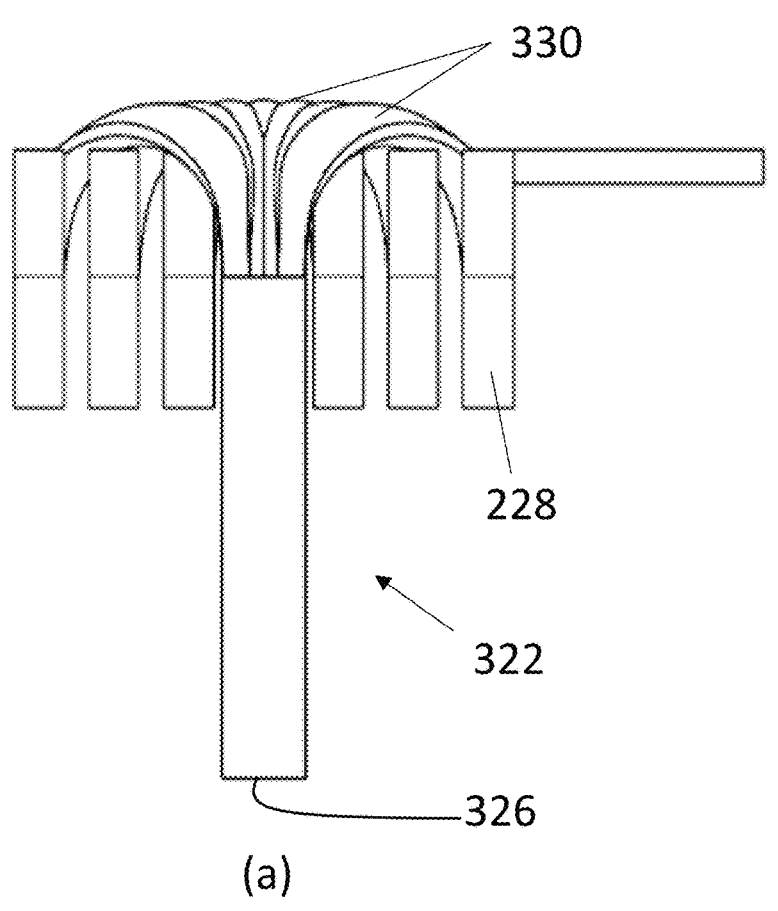
FIGS. 18(*a* and *b*) are schematic drawings of a glue channel within the connecting blocks for fixing to a connecting elements according to a second example of the present invention, where (a) is a side view perspective of the glue channel; and (b) is a top view of the glue channel.
Figure 18:
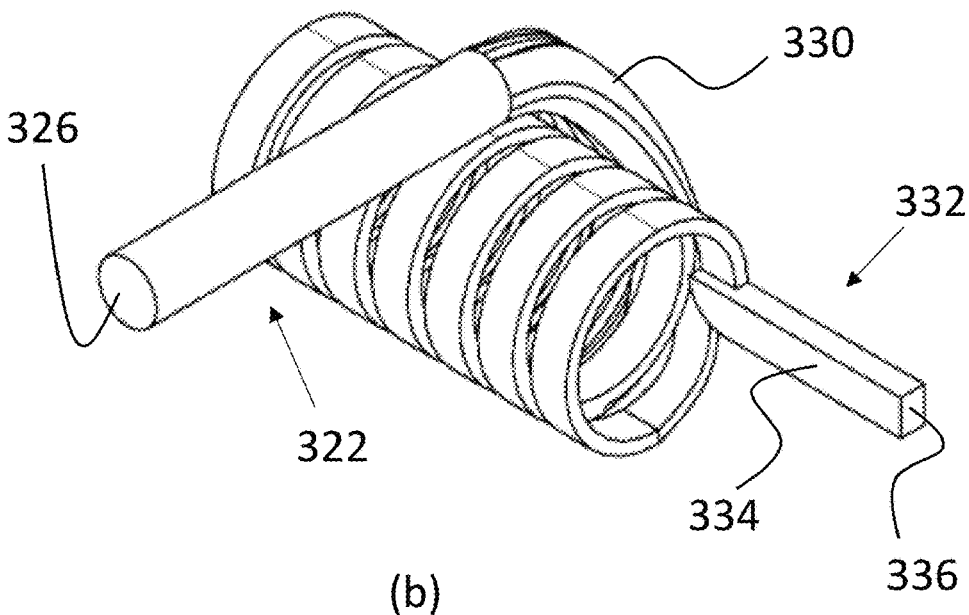

However, there are other examples of distributing the adhesive along the connecting end of the rod when inserted into the socket so as to ensure a good bond between the rod and the connecting block according to the present invention. In another example of the glue channel shown in FIGS. 18(*a* and *b*), the groove comprises a plurality of discrete circular grooves that are spaced apart along the axial length of the socket which provides a plurality of spaced apart or discrete circular glue channels 228 for distributing the adhesive across the connecting end of the rod. To supply adhesive to each of the plurality of circular glue channels, the inlet 322 comprises a plurality of inlet pathways 330 diverging from a single inlet opening 326 as shown in FIGS. 18(*a* and *b*). Each of the plurality of inlet pathways 330 supplies a respective circular glue channel of the plurality of spaced apart circular glue channels 228. This allows adhesive to be supplied to each of the plurality of circular glue channels 228 through a single injection of adhesive into the inlet opening 326 of the inlet 322. This is clearly demonstrated in the schematic drawing of the plurality of circular glue channels in FIG. 18*b*. The number and spacing of circular grooves, and thus the circular glue channels 228, controls the amount of adhesive that is deposited on the exterior surface of the connecting end of the rod between the internal wall of the socket and the connecting end of the rod when the rod is inserted into the socket.

Also shown in FIGS. 18(*a* and *b*) is an outlet 332 having an outlet pathway 334 in common with the plurality of circular glue channels 228 in the sense that it is in fluid communication with the plurality of circular glue channels 228. As described above, the outlet 332 provides an indication that the adhesive has filled the plurality of circular glue channels 228. The outlet pathway 334 is located so that the adhesive flows through of the plurality of glue channels 228 before exiting the outlet opening 336. The outlet pathway 334 is shown extending across the plurality of circular glue channels 228 to a single outlet opening 336 such that the outlet pathway 334 is shared amongst the plurality of circular glue channels 228.

Figure 19:
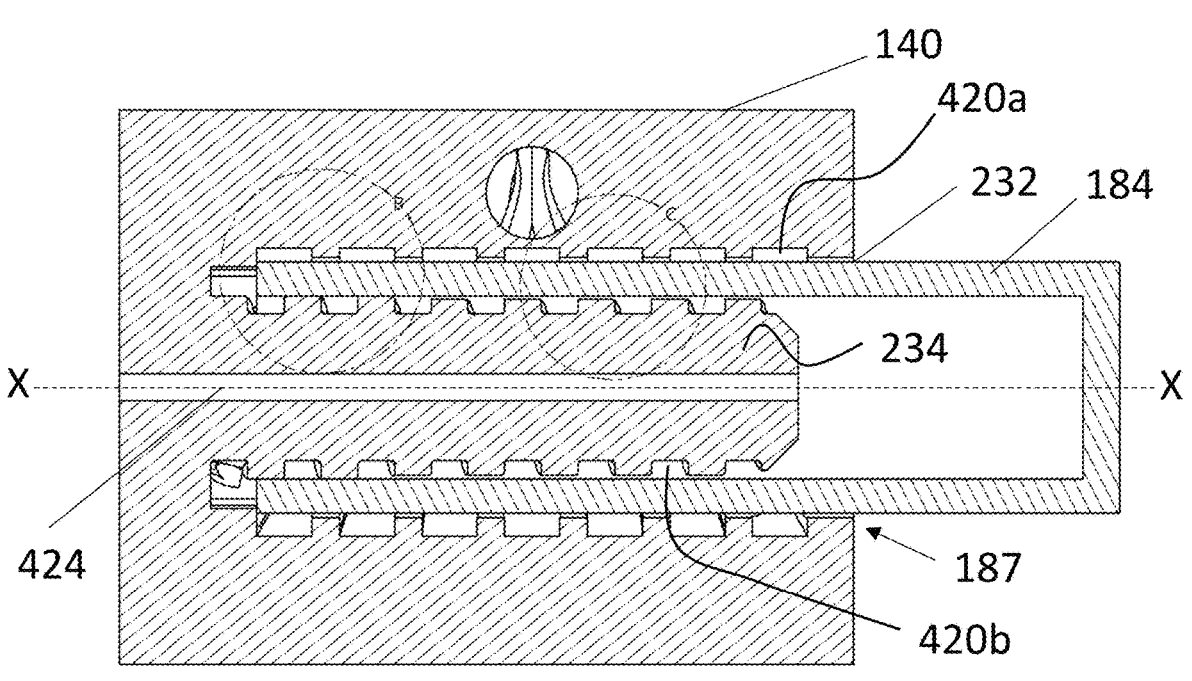
FIG. 19 is a cross-sectional view showing a joint between a connecting block and a connecting element comprising external and internal glue channels according to a third example of the present invention.

Whilst the use of lightweight materials such as plastic help to reduce the weight of the assembly of connecting blocks and connecting elements, e.g. open frame structure discussed above, using lightweight connecting elements also helps to reduce the weight of the assembly. One example of a lightweight connecting element is hollow rod. However, the use of a hollow rod has some draw backs as a connecting element. One of the main draw backs is the risk that the hollow rod may collapse as a result of stress at the entrance of the socket. When the connection between the connecting block and the rod relies on the rod being inserted into a socket in the connecting block, there are stress concentration areas around the vicinity at the entrance of the socket. This is particularly in the region at the entrance of the socket which has relatively sharp edge 232 as shown in FIG. 19 where the shape of the wall of the socket abruptly changes. The bending moments experienced by the rod are concentrated around the region around the entrance of the socket, particularly at the edge 232 of the socket 187 with the risk of the edge of the socket impinging against the wall of the rod 184. Without any internal support, there is the risk that the rod 184 will bend and in a worst case scenario collapse due to the stress concentred at the edge 232 of the socket 187.

To mitigate this problem, an insert 234 is provided in the socket 187 which is receivable in the hollow portion of the rod 184 so as to provide an internal support when the connecting end of the rod is inserted into the socket of the connecting block as shown in FIG. 19. The insert shown in FIG. 19 extends axially along at least a portion of the longitudinal length of the socket having an axis X-X that is concentric with the longitudinal axis of the socket. Introducing an insert 234 into the socket 187 of the connecting block also introduces further manufacturing complexities to include the glue channels in the socket. The use of additive manufacturing or 3D printing in the fabrication of the connecting blocks provides the opportunity to integrally form complex shapes internally of the connecting block.

To provide a secure bond between the rod and the connecting block, glue channels are formed around the internal wall of the socket and the external surface of the insert. In the particular embodiment of the present invention, grooves are formed around the internal wall of the socket to form a first glue channel 420*a* when the rod is inserted into the socket as shown in the example of the present invention shown in FIG. 17 and grooves are formed around the outer periphery or surface of the insert to form a second glue channel 420*b* when the rod is inserted into the socket. Due to the position of the first groove on the internal wall of the socket and the second groove on the exterior surface of the insert, the first glue channel 420*a* is shown in FIG. 19 being opposite to the second glue channel 420*b*. Thus, both the external and the internal surfaces of the connecting end of the rod are bonded to the internal wall of the socket and the external surface of the insert respectively (see FIG. 19). A ventilation hole 424 can be incorporated into the insert so as to prevent the build-up of air in the interior of the rod when the rod is inserted into the socket 187. The ventilation hole 424 is a through hole that extends from the insert to the exterior of the connecting block so as to allow air to escape the interior of the rod when it is inserted into the socket.

Figure 20A:
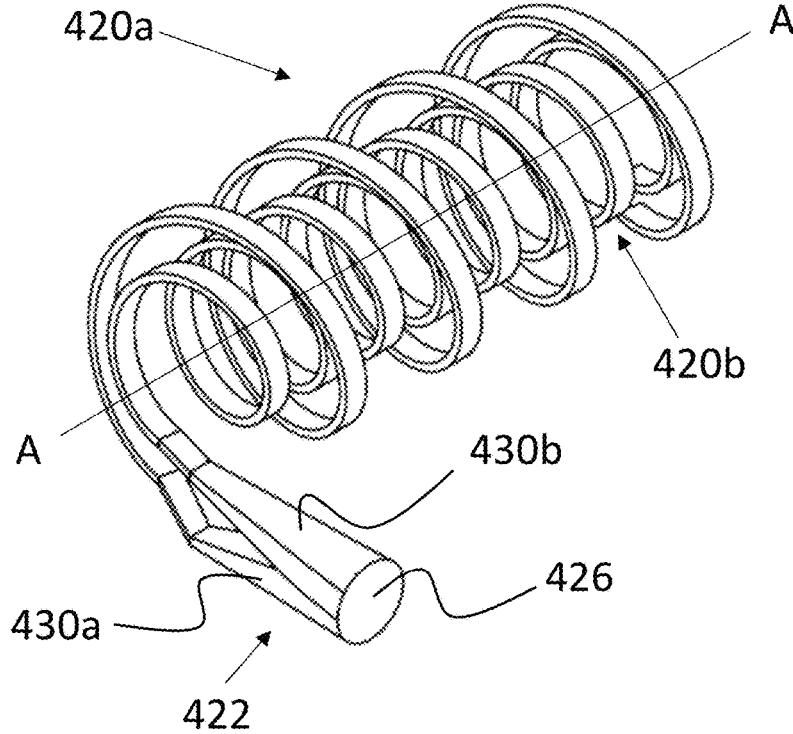
FIGS. 20*a* and 20*b* are a schematic drawing of one example of the glue channels to form the joint shown in FIG. 19.

To supply adhesive to the first and second glue channels 420*a*, 420*b* from a single point of injection where the socket 187 comprises an insert 134, in an example of the present invention, the inlet pathway from the inlet opening 426 external of the connecting block comprises a plurality of inlet pathways 430*a*, 430*b* that diverges from a single inlet opening 426 such that the longitudinal axis A-A of the second glue channel 420*b* is concentric to the longitudinal axis of the first glue channel 420*a*. In one example of providing a first and second glue channels 420*a*, 420*b* are shown in FIGS. 20(*a* and *b*) and shows the arrangement of spiral shaped glue channels for the first and second glue channels 430*a*, 430*b*. Each of the first and second glue channels can be supplied with adhesive by a first and second inlet where each of the first and second inlets being supplied from separate inlets openings. Alternatively, the first and second glue channels 420*a*, 420*b* can be supplied from a single inlet opening 426 that branches into multiple inlet pathways 430*a*, 430*b*, each of the multiple pathways supplying the respective first and second glue channels 420*a*, 420*b*. The inlet shown in FIGS. 20(*a* and *b*) comprises first and second inlet pathways 430*a*, 430*b* in fluid communication with the first and second glue channels 420*a*, 420*b* that is supplied from a single or common inlet opening 426 external of the connecting block. Each of the first and second inlet pathways 430*a*, 430*b* branch out to their respective first and second glue channels 420*a*, 420*b* from the inlet opening 426. Each of the first and second glue channels 420*a*, 420*b* can comprise separate outlets to provide an indication that their respective first and second glue channels are filled with adhesive. Alternatively, a common outlet can be provided to both first and second glue channels as discussed above.

Figures 20B, 21A:
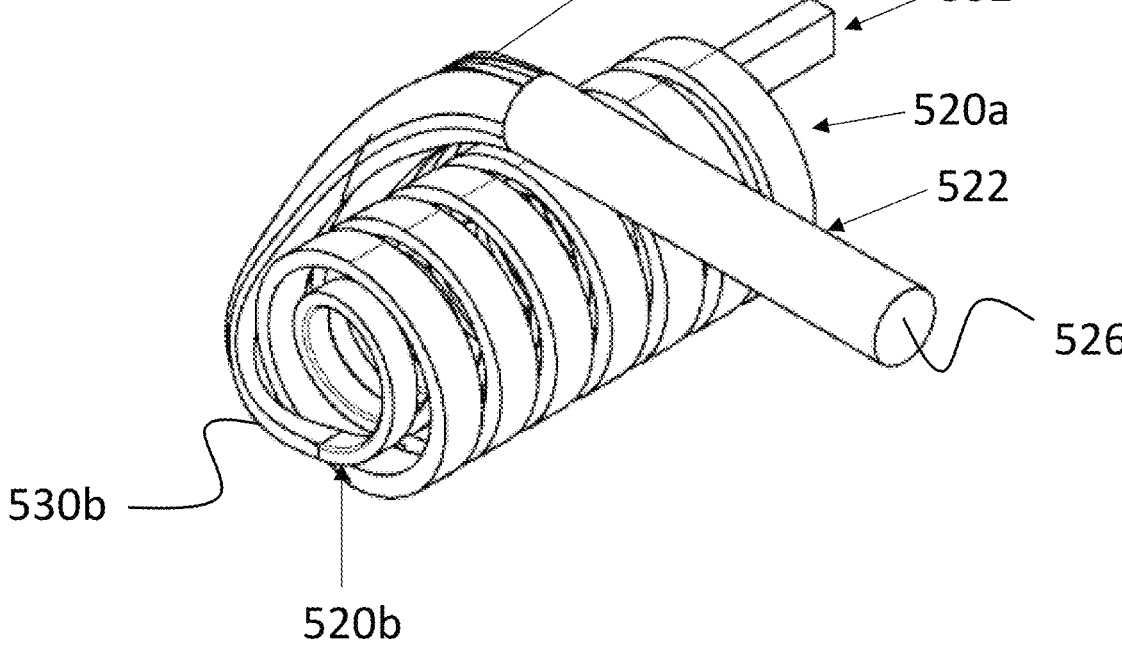
FIGS. 21*a* and 21*b* are a schematic drawing of another example of the glue channels forming the joint shown in FIG. 19.
Figure 21B:
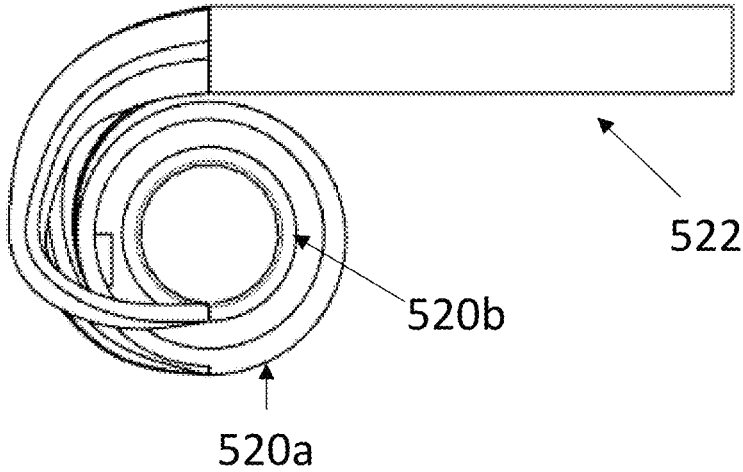

FIGS. 21(*a* and *b*) shows another example of providing first and second glue channels for supplying adhesive to the internal wall of the socket and the external surface of the insert respectively. In the arrangement of the glue channel in the example shown in FIGS. 21(*a* and *b*), the glue channels supplying adhesive to the internal wall of the socket and the exterior surface of the insert is based on a combination of a spiral type 520*a* and the discrete circular rings 520*b* discussed above with reference to FIGS. 17 and 18(*a* and *b*). In the particular example shown in FIGS. 21(*a* and *b*), the grooves formed in the internal wall of the socket cooperates with the exterior surface of the connecting end of the rod to form discrete circular glue channels 520*a* and the groove on the exterior surface of the insert cooperates with the interior surface of the connecting rod to form a spiral shaped glue channel 520*b*. Having a combination of discrete circular glue channels externally of the rod and spiral glue channels internally of the rod allows both types of glue channels to be supplied with a single injection of adhesive into the inlet 522. To cater for supplying adhesive to the differently shaped glue channels, the inlet 522 comprises a plurality of inlet pathways 530*a* that diverge to supply adhesive to the discrete circular glue channels of the first glue channel 520*a* exterior of the rod and a single inlet pathway 530*b* for supplying adhesive to the spiral glue channel of the second glue channel 520*b* interior of the rod as shown in FIG. 21*a*. However, different arrangements of the glue channels for supplying adhesive to the exterior surface of the rod and the interior surface of the rod are applicable in the present invention and can include different arrangements of the glue channels discussed above with reference to FIGS. 17 and 18(*a* and *b*). Also shown in FIGS. 21*a* and 21*b* is an outlet 532 in fluid communication with the first and second glue channels 520*a*, 520*b* to provide an indication of the filling of the respective first and second glue channels 520*a*, 520*b*.

Whilst the particular examples of the glue channel is formed by incorporating a groove in the internal wall of the socket as shown in FIGS. 17 to 21(*a* and *b*), a glue channel can be formed by providing a groove in the connecting end of the rod such that when the connecting end of the rod is inserted into the socket, adhesive can be injected into the glue channel from the inlet having an inlet opening external of the connecting block and in fluid communication with the glue channel. The inlet pathway is positioned in the connecting block so as to direct the adhesive to one or more grooves in the connecting end of the rod. As the adhesive travels around the grooves in the connecting end of the rod, the adhesive is distributed along the connecting end of the rod inserted in the socket. Once cured, the adhesive forms a joint between the internal wall of the socket and the connecting end of the rod.

The advantage of injecting adhesive through an inlet opening exterior of the connecting block is the ability to assemble a plurality of connecting blocks and connecting rods in a jig to ensure that the assembly is correctly positioned before adhesive is injected into the inlet opening. Having different shaped glue channels interior of the socket for receiving the connecting end of the rod ensures that the adhesive is spread along the connecting end of the rod so as to provide a good bond between the connecting block and the rod. The different shaped glue channels interior of the socket are made possible since the connecting blocks can be manufactured by additive manufacturing or 3D printing which allows complex shapes to be incorporated internally within the connecting blocks.

The invention claimed is:

1. A load handling device configured for lifting and moving one or more containers stackable in a storage and retrieval system, the storage and retrieval system including a grid structure having a plurality of grid members including a first set of grid members and a second set of grid members, the second set of grid members being substantially perpendicular to the first set of grid members such that the plurality of grid members are arranged in a grid pattern for guiding movement of the load handling device on the grid structure, the load handling device comprising:

a plurality of modular sections arranged in a vertical stack, the plurality of modular sections including:

a) a container lifting mechanism including a grabber device configured to releasably grip a container, and a drive mechanism configured to raise and lower the grabber device;

b) a wheel assembly including a first set of wheels for engaging with the first set of grid members to guide movement of the load handling device in a first direction and a second set of wheels for engaging with the second set of grid members to guide the movement of the load handling device in a second direction, wherein the second direction is transverse to the first direction;

c) a wheel positioning mechanism configured for selectively lowering or raising the first set of wheels or the second set of wheels into engagement or disengagement with a first set of grid members or a second set of grid members;

d) electrical components including a processor for controlling the container lifting mechanism and wheel positioning mechanism, wherein each of the plurality of modular sections includes:

at least four connecting blocks, each of the at least four connecting blocks being connected to two other connecting blocks in a single modular section by one or more substantially horizontal connecting elements to form a rectangular frame, and wherein the at least four connecting blocks of vertically adjacent modular sections are connectable in the vertical stack by one or more substantially vertical connecting elements to form an open frame structure including a plurality of the rectangular frames, said open frame structure being configured to support the container lifting mechanism, the wheel assembly, the wheel positioning mechanism and the electrical components.

2. The load handling device of claim 1, wherein the at least four connecting blocks comprise:

four corner brackets such that each corner bracket of the four corner brackets is connected to two other corner brackets in a single modular frame to form the rectangular frame.

3. The load handling device of claim 1, wherein one or more of the horizontal and/or vertical connecting elements comprises:

a connecting rod or tube.

4. The load handling device of claim 3, wherein one or more of the at least four connecting blocks comprises:

a socket for receiving an end of the connecting rod or tube.

5. The load handling device of claim 4, wherein the socket has a substantially cylindrical internal wall, the cylindrical internal wall having a groove extending continuously around at least a portion of the cylindrical internal wall of the socket for distributing an adhesive axially along a receiving end of the rod, the groove being configured to form a glue channel when the receiving end of the connecting rod is inserted into the socket.

6. The load handling device of claim 5, wherein the one or more of the at least four connecting blocks comprises:

one or more injection points in fluid communication with the groove being configured for injecting adhesive into the glue channel.

7. The load handling device of claim 1, wherein the rectangular frames of one or more of the plurality of modular sections are braced by one or more bracing elements extending between opposing horizontal connecting elements.

8. The load handling device of claim 1, wherein the one or more vertical connecting elements extends vertically through the connecting blocks of one or more of the at least four connecting blocks of vertically adjacent rectangular frames in the vertical stack.

9. The load handling device of claim 1, wherein at least one or more of the at least four connecting blocks of one or more of the plurality of modular sections is formed from a polymer.

10. The load handling device of claim 1, wherein the open frame structure defines a volume for housing a container receiving space.

11. The load handling device of claim 1, wherein at least one or more of the at least four connecting blocks of the one or more of the plurality of modular sections comprises:
one or more mounts for a pulley.

12. The load handling device of claim 1, wherein at least one or more of the at least four connecting blocks of the one or more of the plurality of modular sections comprises:
one or more mounts for a motor.

13. The load handling device of claim 1, wherein at least one or more of the at least four connecting blocks of the one or more of the plurality of modular sections comprises:
at least a portion of one or more of the container lifting mechanism, and/or the wheel assembly, and/or the wheel positioning mechanism, and/or the electrical components.

14. The load handling device of claim 13, wherein at least a portion of one or more of the container lifting mechanism, and/or the wheel assembly, and/or the wheel positioning mechanism, and/or the electrical components is integrally formed with one or more of the at least four connecting blocks of one or more of the plurality of modular sections.

15. The load handling device of claim 14, wherein each wheel of the wheel assembly is mounted on a wheel mount.

16. The load handling device of claim 15, wherein the wheel mount is integrally formed with a connecting block of a given modular section.

17. The load handling device of claim 15, wherein a connecting block of a given modular section comprises:
a first wheel mount for a wheel of the first set of wheels, and a second wheel mount for a wheel of the second set of wheels.

18. The load handling device of claim 17, wherein the first and second wheel mounts comprise;
a plurality of bosses along an edge of the first and second mounts, each of the plurality of bosses of the first and second wheel mounts including an opening that is axially aligned along a wheel positioning axis, the wheel positioning axis being an axis along which a respective first or second set of wheels is raised and lowered, the plurality of bosses of the first and second wheel mounts being spaced apart such that the plurality of bosses of the first and second wheel mounts interdigitate and openings in each interdigitated boss of the first and second wheel mounts is axially aligned along a wheel positioning axis to receive the vertical connecting element through a respective openings, a spacing between the bosses of the first and second wheel mounts being sufficiently spaced apart so as to allow the first wheel mount to move independently of the second wheel mount along the wheel positioning axis.

19. The load handling device of claim 1, wherein the wheel positioning mechanism comprises:
a cam mechanism, and wherein one or more of the at least four connecting blocks of one or more of the plurality of modular sections includes at least a portion of the cam mechanism.

20. The load handling device of claim 19, wherein the at least portion of the cam mechanism is integrally formed with the one or more of the at least four connecting blocks of one or more of the plurality of modular sections.

21. The load handling device of claim 1, wherein the container lifting mechanism comprises:
a) a first set of spools and a second set of spools, each spool of the first set of spools and second set of spools being configured for carrying a lifting tether having a first end anchored to the container-gripping assembly and a second end anchored to the spool;
b) a rotatable shaft, wherein the first and/or second set of spools are mounted to the rotatable shaft such that the rotatable shaft is common to the first and/or second sets of spools; and
c) the drive mechanism including a drive pulley mounted to the rotatable shaft common to the first and/or second sets of spools such that rotation of the rotatable shaft by the drive pulley will drive rotation of the first and/or the second sets of spools.

22. The load handling device of claim 21, wherein the rotatable shaft is mounted to the one or more horizontal connecting elements connecting two adjacent connecting blocks.

23. The load handling device of claim 1, wherein any one or more of the container lifting mechanism, and/or the wheel assembly, and/or the wheel positioning mechanism, and/or the electrical components is shared amongst two or more of the plurality of modular sections.

24. The load handling device of claim 1, wherein a plurality of vertically adjacent rectangular frames defines a volume for housing at least a portion of one or more of the container lifting mechanism, and/or the wheel assembly, and/or the wheel positioning mechanism, and/or the electrical components.

25. The load handling device of claim 1, wherein the plurality of modular sections in ascending order of height of the load handling device comprises:
a first, a second, a third and a fourth modular section, the first modular section being at a bottom of the load handling device, and the fourth modular section being at a top of the load handling device.

26. The load handling device of claim 25, wherein the first modular section comprises:
the wheel assembly.

27. The load handling device of claim 25, wherein the fourth modular section comprises:
one or more cradles for supporting the electrical components.

28. The load handling device of claim 27, wherein the one or more cradles are mounted to one or more of the horizontal connecting elements connecting two adjacent connecting block of the fourth modular section.

29. The load handling device of claim 1, wherein one or more of the connecting blocks of one or more of the plurality of rectangular frames is integrally formed as a single body.

30. A method of construction of a load handling device, the method comprising:
i) forming a rectangular frame by linking together at least four connecting blocks by one or more horizontal connecting elements; and
ii) linking a plurality of rectangular frames together in a vertical stack by connecting the connecting blocks of vertically adjacent rectangular frames by one or more vertical connecting elements to form an open frame structure, the open frame structure supporting:
a) a container lifting mechanism including a grabber device configured to releasably grip a container, and a drive mechanism configured to raise and lower the grabber device;

b) a wheel assembly arranged to support the vehicle body, the wheel assembly including a first set of wheels for engaging with a first set of grid members to guide movement of the load handling device in a first direction and a second set of wheels for engaging with a second set of grid members to guide movement of the load handling device in a second direction, wherein the second direction is transverse to the first direction, each wheel of the first and second sets of wheels being mounted on a wheel mount;

c) a wheel positioning mechanism configured for selectively lowering or raising the first set of wheels or the second set of wheels into engagement or disengagement with the first set of grid members or the second set of grid members; and d) electrical components including a processor for controlling the lifting and wheel positioning mechanism.

31. The method of claim 30, comprising:

forming the open frame structure by inserting one or more of the plurality of horizontal and/or vertical connecting elements into an opening in one or more of the at least four connecting blocks.

32. The method of claim 30, comprising;

attaching at least a portion of one or more of the container lifting mechanism, and/or the wheel assembly, and/or the wheel positioning mechanism, and/or the electrical components to the open frame structure.

33. The method of claim 30, comprising:

integrally forming at least a portion of one or more of the container lifting mechanism, and/or the wheel assembly, and/or the wheel positioning mechanism from one or more of the at least four connecting blocks of the open frame structure.

34. The method of claim 30, comprising:

additive manufacturing or 3D printing one or more of the at least four connecting blocks of one or more of the plurality of rectangular frames of the open frame structure.

35. The method of claim 30, comprising:

assembling one or more of the plurality of rectangular frames in a jig such that the at least four connecting blocks are connected to their respective horizontal connecting elements.

\* \* \* \* \*